US006922516B2

(12) United States Patent  
Kurashima et al.

(10) Patent No.: US 6,922,516 B2  
(45) Date of Patent: Jul. 26, 2005

(54) RELEASING MECHANISM OF AN OPTICAL MODULE FROM A HOST BOARD

(75) Inventors: Hiromi Kurashima, Yokohama (JP); Toshio Mizue, Yokohama (JP); Kazushige Oki, Yokohama (JP); Toshiyuki Ogushi, Fujisawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 3 days.

(21) Appl. No.: 10/342,317

(22) Filed: Jan. 15, 2003

(65) Prior Publication Data

US 2004/0081418 A1 Apr. 29, 2004

(30) Foreign Application Priority Data

Jan. 15, 2002 (JP) .................................... P2002-006242  
Jun. 21, 2002 (JP) .................................... P2002-182091  
Aug. 8, 2002 (JP) .................................... P2002-231919

(51) Int. Cl.[7] .............................. G02B 6/00; G02B 6/36  
(52) U.S. Cl. ..................................... 385/134; 385/53  
(58) Field of Search ............................. 385/88, 53, 89, 385/92, 70, 77, 134

(56) References Cited

U.S. PATENT DOCUMENTS

| | | | |
|---|---|---|---|
| 6,304,436 B1 | 10/2001 | Branch et al. | |
| 6,335,869 B1 | 1/2002 | Branch et al. | |
| 6,692,159 B2 * | 2/2004 | Chiu et al. | 385/53 |
| 2002/0150353 A1 * | 10/2002 | Chiu et al. | 385/88 |
| 2003/0133665 A1 * | 7/2003 | Chiu et al. | 385/53 |

FOREIGN PATENT DOCUMENTS

| | | |
|---|---|---|
| JP | 62-170902 | 10/1987 |
| JP | 3-8489 | 1/1991 |

OTHER PUBLICATIONS

Proceedings of the 2001 IEICE general conference (The Institute of Electronics, Information and Communication Engineers), Mar. 26–29, 2001 (w/ English Translation).

* cited by examiner

Primary Examiner—Chandrika Prasad  
(74) Attorney, Agent, or Firm—McDermott Will & Emery LLP

(57) ABSTRACT

The present invention provides an optical module capable of being readily dismounted from a host board while solving the problem discussed in the specification. An optical module 10 according to the present invention is an optical module 10 to be inset into a host board 40, which comprises a projection 15 formed in a housing 14 and adapted to engage with a hook 41 provided in the host board 40, and a lever 20 pivotably mounted on the housing 14 in order to disengage the hook 41 engaging with the projection 15 to release the engagement, wherein the lever 20 has a first portion 21A adapted to move with exertion of a force in a direction toward the housing 14, and a second portion 21B being adjacent to the projection 15 and adapted to move according to the movement of the first portion 21A. In this arrangement, as the first portion 21A moves with exertion of the force on the first portion 21A, the second portion 21B moves in an upheaving direction of the projection 15 to release the engagement between the hook 41 and the projection 15.

27 Claims, 24 Drawing Sheets

RELEASING MECHANISM OF AN OPTICAL MODULE FROM A HOST BOARD

BACKGROUND OF THE INVENTION

1. Field of the Invention

The present invention relates to a hot-plug type optical module.

2. Related Background Art

An optical module of the pluggable type, which is used in such a manner that the optical module loading with a light emitting unit and/or a light receiving unit is installed in a host board, was known in the prior art. This optical module is generally fixed to the host board, as shown in FIG. 28A and FIG. 28B, through engagement between a hook 41 provided in the host board and a projection 15 provided in a housing 14 of the optical module. The optical module thus fixed is dismounted in the following manner from the host board. In the first step, as shown in FIGS. 28A and 28B, a wedge-shaped actuator 50 is slid along a direction of an arrow to be pushed against the hook 41. This results in lifting the hook 41 up along a slant surface of the actuator 50, whereby the hook 41 is disengaged from the projection 15. While the hook 41 is kept in a dismounted state, the optical module is then drawn out of the host board.

SUMMARY OF THE INVENTION

However, the mechanism for dismounting the optical module, described above, had the problem of poor workability. Namely, in order to disengage the hook 41, the actuator 50 had to be slid to in the pushing direction of the optical module on the occasion of pulling the optical module out of the host board, which was an inefficient work. Particularly, optical modules are mounted in an integrated form on the host board in many cases, and work space is limited. It was thus difficult to draw the optical module while pushing the actuator 50 toward the hook 41.

An object of the present invention is therefore to solve the above problem and provide an optical module capable of being readily dismounted from the host board.

An optical module according to the present invention is an optical module to be installed into a host board, comprising: a module body to be inserted into the host board; a projection formed on the module body and adapted to engage with a hook provided in the host board; and a lever pivotably mounted on the module body in order to disengage the hook engaging with the projection, to release engagement therebetween, wherein the lever comprises: a first portion which moves when a force is applied thereon in a direction toward the module body; and a second portion which is adjacent to the projection and which moves according to movement of the first portion. When the first portion moves under the force, the second portion moves in an upward direction of the projection to raise the hook in the upward direction of the projection and release the engagement between the hook and the projection.

The optical module has the lever pivotable relative to the module body and is arranged so that as the first portion of the lever is moved toward the module body, the second portion adjacent to the projection moves upward to disengage the hook engaging with the projection. Namely, the hook is disengaged by moving the first portion toward the module body, i.e., by moving the first portion in the direction of the force for holding the module body, which can enhance the workability in dismounting the optical module.

In the above optical module, the lever may further comprise restoring means for locating the second portion nearer to the module body than a top portion of the projection.

Since the lever has the restoring means for locating the second portion nearer to the module body than the top portion of the projection, the second portion is located nearer to the body side than the top portion of the projection by the restoring means when no force is applied on the first portion. Accordingly, the optical module is smoothly fixed to the host board while the second portion is prevented from obstructing the engagement of the hook with the projection. The restoring means may be implemented by mounting an elastic member such as a spring or the like on the lever, or by making the lever itself of an elastic material.

In the above optical module, a direction of the force on the first portion may be a direction normal to an inserting direction of the module body.

When the direction of the force on the first portion is the direction normal to the inserting direction of the module body as in this arrangement, it is feasible to efficiently utilize the force for holding the optical module.

The above optical module may be constructed in a arrangement that in the lever comprises: a platelike part one end of which forms the first portion and the other end of which forms the second portion; and a mounting part for mounting the platelike part on the module body, which is integrally provided in an intermediate region between the first portion and the second portion of the platelike part, wherein a region between the two parts of the platelike part. The mounting part is an elastically deformable V-shaped curled part. The second portion is located nearer to the module body than the top portion of the projection by a restoring force of the curled part.

In the case of the lever in which the platelike part and the mounting part are integrally formed through the V-shaped curled part and the mounting part is fixed to the module body, the platelike part pivotally moves relative to the module body about the curled part as a center. As a force is applied on one end of the platelike part (the first portion) in the direction toward the module body, the platelike part acts like a lever with the curled portion as a fulcrum, and the other end of the platelike part (the second portion) moves in a leaving direction from the module body. Since the curled part is elastically deformable, the platelike part returns to the original position (angle) by the restoring force of the V-shaped curled part with no force being applied on the first portion. By integrally forming the lever in this arrangement, it is feasible to make the lever readily.

The above optical module may be constructed in a arrangement that a rib located between the curled part and the first portion and projecting toward the mounting part is formed on the platelike part. During the movement of the first portion toward the mounting part the rib goes into contact with the module body or with the mounting part. A contact part of the rib serves as a center of pivotal motion of the platelike part.

Since the rib projecting toward the mounting part is formed in the platelike part in this way, the platelike part moves with the contact part as a center of motion when the first portion moves toward the mounting part to bring the rib into contact with the module body. Since the rib is formed at the position closer to the first portion than to the curled part, the moving amount of the second portion becomes larger with the movement of the first portion, whereby the hook can be efficiently disengaged.

The optical module may be configured so that the first portion is provided with a handle having an operation part at a position apart from a center of the module body.

Since the handle with the operation part being located apart from the center of the module body is mounted on the first portion, the height (thickness) of the central part of the module body can be decreased. This arrangement can decrease the height of an array of optical modules arranged vertically and increase the density of optical modules.

In the optical module, preferably, the module body comprises: an optical unit having at least either a light emitting unit or a light receiving unit; an optical-unit circuit board loaded with a circuit for operating the optical unit; and a housing for housing the optical unit and the optical-unit circuit board; and the projection is formed in the housing.

In the optical module, preferably, the optical unit has a light emitting unit and a light receiving unit.

In the optical module, preferably, the optical unit has at least one light emitting unit.

In the optical module, preferably, the optical unit has at least one light receiving unit.

In the optical module, the lever may be made of metal. When the lever is made of metal in this way, the lever comes to have excellent mechanical properties and is hard resistant to a breakdown even with application of an external force.

In the optical module, the lever may be made of plastic.

When each lever is made of plastic in this way, levers can be formed in different colors, whereby optical modules can be distinguished from each other by their levers during mounting a plurality of optical modules on the host board.

The optical module may be constructed in a arrangement wherein the optical module further comprises an actuating member constructed so as to include a sliding contact part slidingly contacting the first portion of the lever and surrounding an optical connector insertion slot into which an optical connector is inserted. The actuating member is arranged to be rotatable about an axis part being a portion adjacent to the sliding contact part. When the actuating member is rotated about the axis part, the sliding contact part slides on the first portion and moves the first portion toward the module body.

By using the arrangement that the optical module further comprises the actuating member including the sliding contact part slidingly contacting the first portion and wherein with rotation of the actuating member the sliding contact part slides on the first portion, by which the first portion is moved toward the module body with rotation of the actuating member, the first portion is readily moved by the operation of rotating the actuating member, whereby the hook engaging with the projection can be disengaged. Particularly, this arrangement is effective in the case where optical modules are integrated in high density on the host board, because it is sometimes difficult to secure sufficient space for manipulation of the lever. Since the actuating member is of the shape surrounding the optical connector insertion slot, the actuating member does not obstruct the insertion work of the optical connector.

The optical module may be constructed in a arrangement that the axis part is comprised of a portion of the actuating member along an edge of a lever mounting surface on which the lever is mounted. Further the sliding contact part extends from the axis part along an insertion direction of the optical connector and a grip part is formed in a portion of the actuating member along an edge of a surface opposite to the lever mounting surface. As the actuating member is rotated in a leaving direction from a state in which the grip part is adjacent to the optical connector insertion slot, the sliding contact part moves the first portion toward the module body.

In the arrangement that the axis part is comprised of the portion along the edge of the lever mounting surface and that the grip part is formed in the portion along the edge of the surface opposite to the lever mounting surface, since the actuating member is rotated in the leaving direction from the adjacent state of the grip part to the optical connector insertion slot, the sliding contact part extending in the insertion direction of the optical connector from the axis part rotates with the rotation of the actuating member. Therefore the sliding contact part slides on the first portion and moves the first portion toward the module body. This arrangement permits easy operation without interfering with other optical modules even in the case where optical modules are arranged in high density.

The optical module may be constructed in a arrangement that the engagement between the hook and the projection is released before the grip part reaches an area occupied by the optical connector to be inserted, through rotation.

Since the engagement between the hook and the projection is released before the grip part reaches the area occupied by the optical connector to be inserted into the optical module in this way, the optical module can be pulled out from the host board even when the optical connector is inserted in the optical module.

The optical module may be constructed in a arrangement that an angle of rotation of the actuating member for releasing the engagement between the hook and the projection is not more than 68°.

The angle of rotation of the actuating member upon the contact of the grip part with the optical connector to be inserted is 68°. Therefore, the optical module can be pulled out from the host board in the arrangement for making the engagement between the hook and the projection released at the angle of rotation not more than 68°, even when the optical connector is inserted in the optical module. The term "angle of rotation" herein means an angle by which the grip part is rotated from the state adjacent to the optical connector insertion slot.

The optical module may be constructed in a arrangement, when the grip part goes into an area occupied by the optical connector to be inserted through rotation or when the grip part crosses over the occupied area through rotation, the engagement between the hook and the projection is released.

By using this arrangement, under the condition that when the grip part enters into the area occupied by the optical connector to be inserted into the optical module or when it crosses over the area, the engagement between the hook and the projection is released so that the optical module enters into the optical connector, the rotation of the actuating member is restricted due to collision of the grip part collides against the optical connector, and as the result, the optical module cannot be pulled out from the host board. Namely, the optical module is prevented from being accidentally dismounted from the host board during the operation of the optical module.

The optical module may be constructed in a arrangement that an angle of rotation of the actuating member for releasing the engagement between the hook and the projection is greater than 68°.

The angle of rotation of the actuating member upon the contact of the grip part with the optical connector to be inserted is 68°. Therefore, the optical module cannot be pulled out from the host board when the optical connector is inserted in the optical module, under the condition that the engagement between the hook and the projection is released when the angle of rotation is greater than 68°.

The optical module may be constructed in a arrangement that the actuating member is rotatable between a first position where the grip part is adjacent to the optical connector insertion slot and a second position where the grip part is located on the same plane as the lever mounting surface. Further a projection adapted to engage with the sliding contact part in order to regulate the rotation in a direction from the second position to the first position of the actuating member, at the second position is formed in the first portion of the lever.

Thus, when the actuating member is rotatable between the first position where the grip part is adjacent to the optical connector insertion slot and the second position where the grip part is located on the same plane as the lever mounting surface, the optical module can be pulled out from the host board by pulling the grip part when the actuating member is located at the second position. Particularly, the arrangement in which the optical module may be pulled by the grip part is effective in the case when optical modules are integrated in high density on the host board so that it is thus difficult to secure sufficient space for holding the optical module. When the lever has the restoring means, the restoring force toward the first position acts on the actuating member, because the first portion is moved in the leaving direction from the module body by the restoring force and as the result the sliding contact part slidingly contacting the first portion is pushed by the first portion. In the arrangement of the present invention, it is easy to pull the grip part, because when the actuating member is located at the second position, the sliding contact part engages with the projection formed in the first portion to restrict the rotation of the actuating member toward the first position.

The optical module may be constructed in a arrangement that the actuating member is further rotatable from the second position in a direction opposite to the direction from the second position to the first position.

At the second position, the movement from the first position toward the second position is not restricted to permit further rotation, whereby, even with application of an excessive force on the grip part in the direction from the first position to the second position, the actuating member can further rotate from the second position, so as to avoid failure such as detachment of the actuating member or the like.

The optical module may be constructed in a arrangement that the optical module further comprises an actuating member having: an axis part along an edge of a lever mounting surface on which the lever is mounted; a sliding contact part formed integrally with the axis part and slidingly contacting the first portion of the lever; and a grip part being normal to the axis part and extending along an edge of an optical connector insertion slot, wherein as the actuating member is rotated about the axis part, the sliding contact part slides on the first portion and moves the first portion toward the module body.

By using this arrangement that the optical module further comprises the actuating member having the sliding contact part slidingly contacting the first portion and that with rotation of this actuating member the sliding contact part slides on the first portion and moves the first portion toward the module body, the first portion can be readily moved by the operation of rotating the actuating member, to disengage the hook engaging with the projection. Particularly, this arrangement is effective in the case where optical modules are integrated in high density on the host board, because it is sometimes difficult to secure sufficient space for manipulation of the lever. Since the actuating member has the components consisting of the axis part along the lever mounting surface, the sliding contact part formed integrally with the axis part, and the grip part extending along the edge of the optical connector insertion slot, the actuating member does not obstruct the insertion work of the optical connector.

The optical module may be constructed in a arrangement that the sliding contact part extends from the axis part in an insertion direction of an optical connector, and that as the actuating member is rotated in a leaving direction from a state in which the grip part is adjacent to the optical connector insertion slot, the sliding contact part moves the first portion toward the module body.

In this arrangement, as the sliding contact part extends in the insertion direction of the optical connector from the axis part, and the grip part rotates the actuating member in the leaving direction from the adjacent state of the grip part to the optical connector insertion slot and as the result, the sliding contact part slides on the first portion may move the first portion toward the module body. This permits easy operation without interfering with other optical modules even in the case where optical modules are arranged in high density. Since the grip part extending in the direction normal to the axis part is prevented from touching the inserted optical connector even during rotation about the axis part as a center, the optical module can be pulled out from the host board by rotating the actuating member, even in the state in which the optical connector is inserted.

The optical module may be constructed in a arrangement wherein the first portion of the lever is so curved that a surface in slide contact with the sliding contact part is concave.

When the first portion of the lever slidingly contacting the sliding contact part is curved, it is feasible to adjust the amount of movement of the first portion toward the module body with the rotation of the actuating member by the curvature. For example, by adjusting the curvature, the second portion may be maintained at a height of the top of the projection after the second portion is lifted up toward the top portion of the projection with the rotation of the actuating member to reach the height of the top and thereafter the first portion is kept from leaving or approaching the module body, even if the actuating member is further rotated, by preventing the first portion from leaving from the module body or closing thereto. This arrangement may conveniently extend the range of the angle of rotation to release the engagement between the projection and the hook.

The optical module may be configured to further comprise a handle having: a contact part located on the opposite side to the first portion with the sliding contact part in between and contacting the sliding contact part; and a holding part projecting in a direction opposite to an insertion direction of the optical connector from an end face having the optical connector insertion slot and being continuous from the contact part.

In this arrangement further comprising the handle projecting from the optical connector insertion slot, the actuating member can be readily operated even in the case where optical modules are integrated in too high density to move the grip part of the actuating member. Namely, the holding part is moved toward the grip part of the actuating member normally to the insertion direction of the optical connector, whereby the contact part of the handle pushes the sliding contact part of the actuating member toward the module body to rotate the actuating member. Since with this rotation of the actuating member the grip part of the actuating member moves to the near side from the end face having the optical connector insertion slot, the grip can be readily manipulated.

The optical module may be constructed in a arrangement that the lever further comprises an extending part projecting and extending from the first portion in a direction opposite to the insertion direction of the optical connector from the end face having the optical connector insertion slot. Further the holding part of the handle is coupled to the extending part of the lever, so that the handle and the lever become continuous.

Using of the arrangement that the lever and the handle are continuous is advantageous in that with movement of the handle toward the grip part of the actuating member, the contact part of the handle pushes the first portion of the lever through the sliding contact part toward the module body whereby the lever moves in the direction to release the engagement between the projection and the hook. When the lever and handle are integrally formed, it is feasible to reduce the number of parts.

The optical module may be constructed in a arrangement that a stick protruding in a direction opposite to the optical connector insertion direction from an end face having the optical connector insertion slot is formed in the grip part of the actuating member.

When the stick protruding from the end face of the optical connector insertion slot is formed in the grip part as in this arrangement, the actuating member can be rotated by placing a finger on the stick. Particularly, the formation of the stick is advantageous in the case where optical modules are integrated in high density, because the space between the optical modules is too narrow to rotate the actuating member by holding the grip part.

The optical module may be configured to further comprise a pawl adapted so that the pawl goes into contact with the optical connector to restrict the movement of the first portion when an optical connector to be coupled to the optical unit is inserted into the housing.

When the movement of the first portion is restricted by the pawl in contact with the optical connector in the inserted state of the optical connector as in this arrangement, it also restricts movement of the second portion which moves according to the movement of the first portion, and the hook engaging with the projection cannot be disengaged. Namely, in the state in which the optical connector is inserted in the optical module, the optical module becomes unable to be pulled out the host board, which can reduce the disadvantage that the optical module accidentally slips off during the operation of the optical module.

DESCRIPTION OF THE PREFERRED EMBODIMENTS

The preferred embodiments of the optical module according to the present invention will be described below in detail with reference to the drawings. The same reference symbols will denote the same elements throughout the description of the drawings and redundant description will be omitted.

Figure 1:
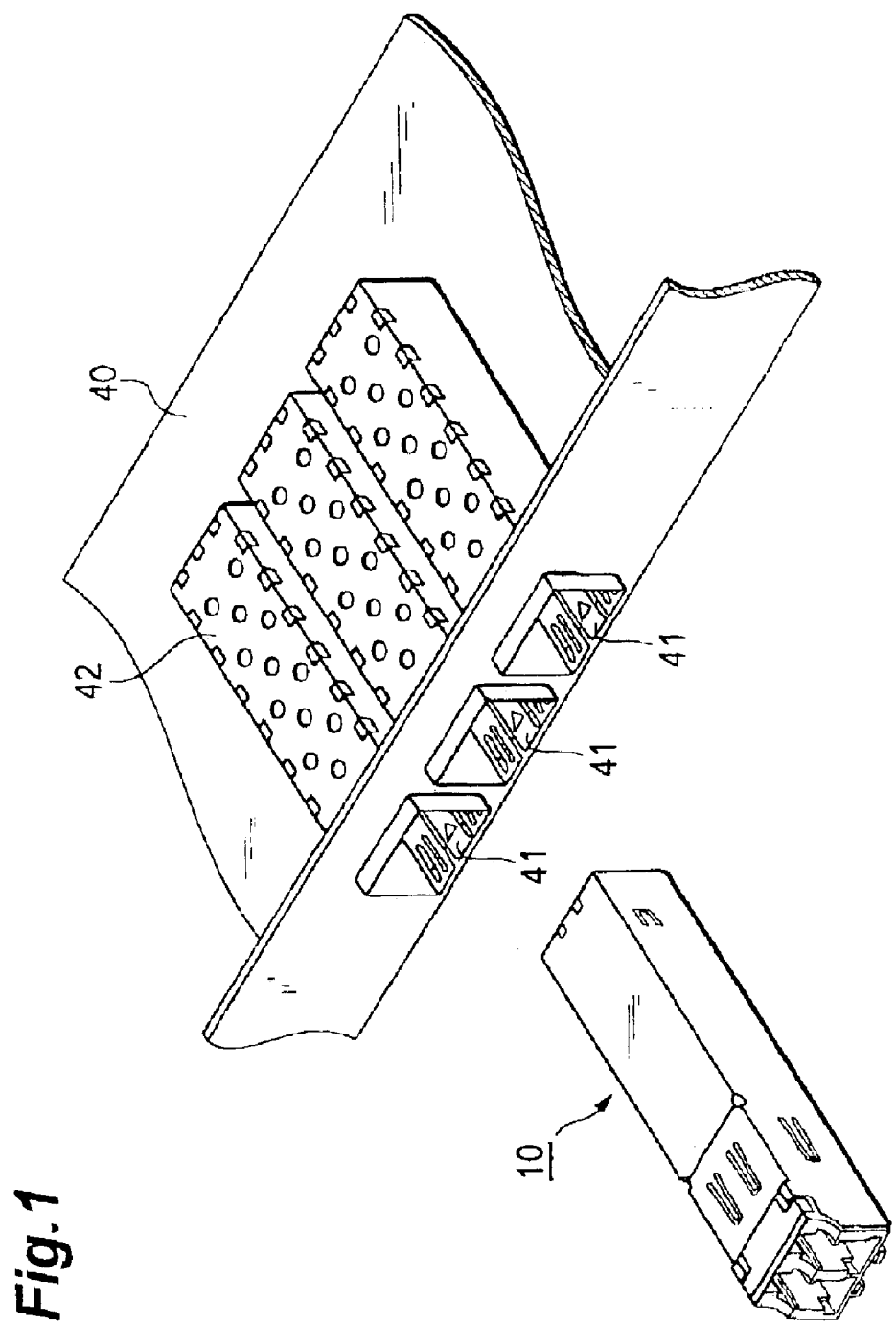
FIG. 1 is a perspective view showing an optical module according to an embodiment and a host board to receive the optical module.
Figure 2:
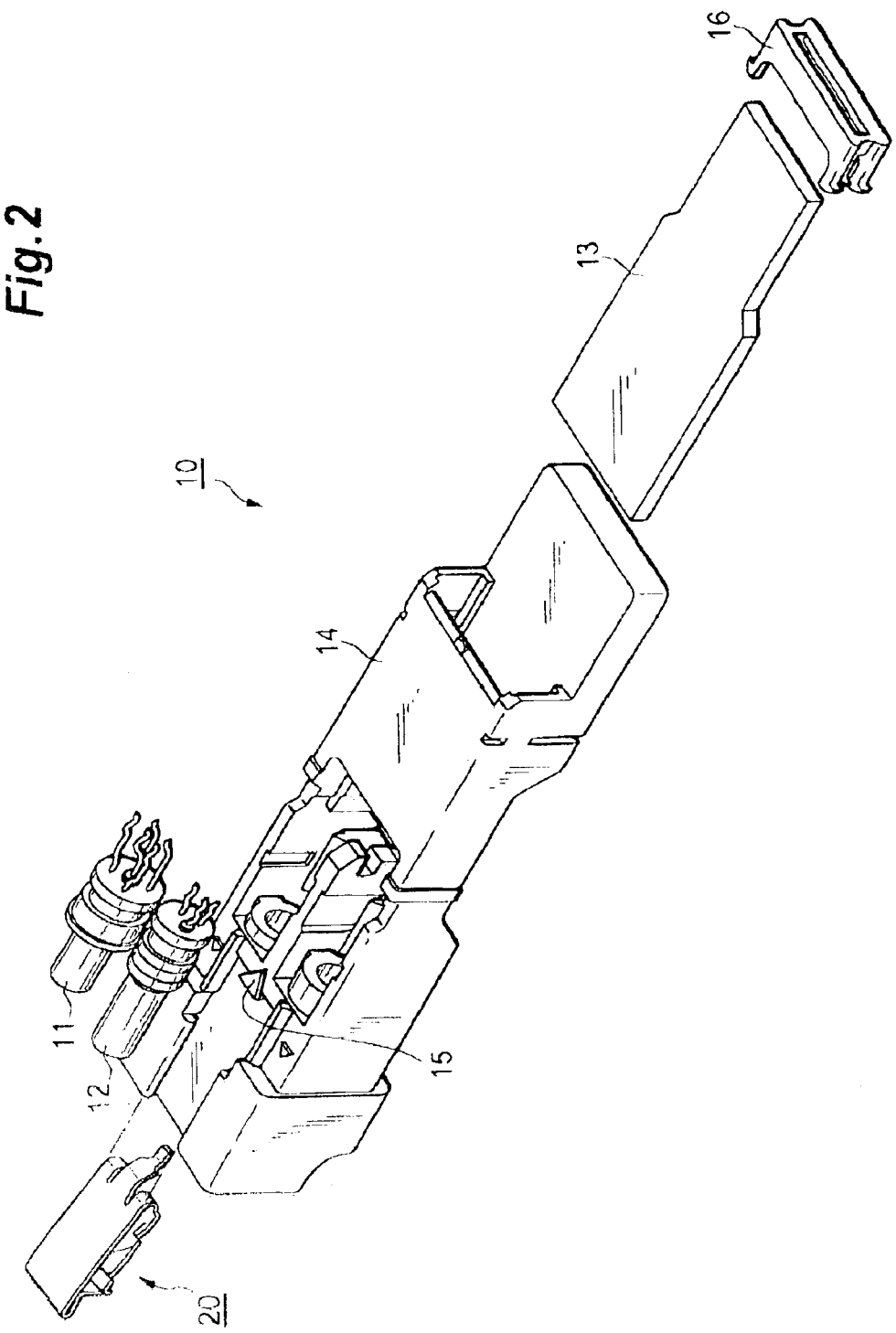
FIG. 2 is an exploded perspective view of an optical module.
Figure 28A:
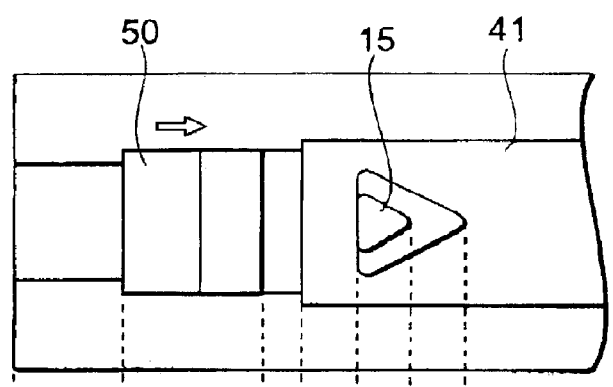
FIG. 28A is a diagram showing the conventional mechanism of releasing the engagement between the projection and the hook.
Figure 28B:
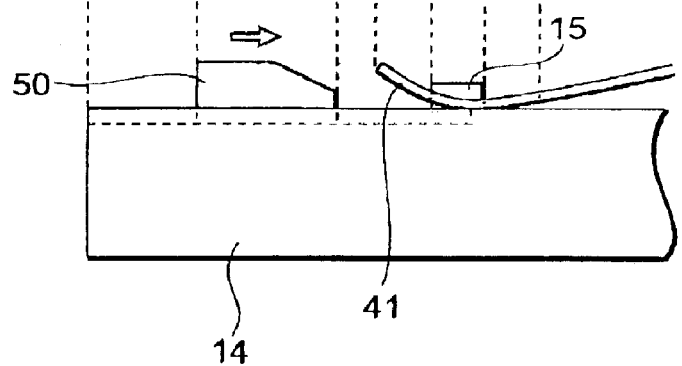
FIG. 28B is a diagram showing the conventional mechanism of releasing the engagement between the projection and the hook.

FIG. 1 is a perspective view showing the optical module 10 according to an embodiment and the host board 40 into which the optical module 10 is to be installed, and FIG. 2 an exploded perspective view of the optical module 10. As shown in FIG. 1, the optical module 10 is inserted into a cage 42 provided in the host board 40. A projection (blocked from view in FIG. 1) formed in the housing 14 of the optical module 10 then goes into engagement with the hook 41 provided in the host board 40, whereby the optical module 10 is fixed to the host board 40. The manner of the engagement between the projection and the hook 41 is the same as the manner of the engagement shown in FIGS. 28A and 28B.

The optical module 10 according to the embodiment will be described below. FIG. 2 is a view of the optical module 10 from an obliquely lower direction in FIG. 1. As shown in FIG. 2, the optical module 10 has a light emitting unit 12, a light receiving unit 11, a circuit board 13 loaded with circuits for operating the light emitting unit 12 and the light receiving unit 11 (which will be referred to together as "optical unit"), and a housing 14 for housing the optical unit and the circuit board 13. The circuit board 13 housed in the housing 14 is supported by a board support 16. The projection 15 to engage with the hook 41 is formed in the housing 14, and a lever 20 is mounted near the projection 15. Although the present example describes the optical transceiver module having the light emitting unit 12 and light receiving unit 11, the module can be a light emitting module having a light emitting unit or a plurality of light emitting units, or a light receiving module having a light receiving unit or a plurality of light receiving units. The number of light emitting unit 12 and light receiving unit 11 in the optical module 10 is not limited to two, but may be four or more.

Figure 3:
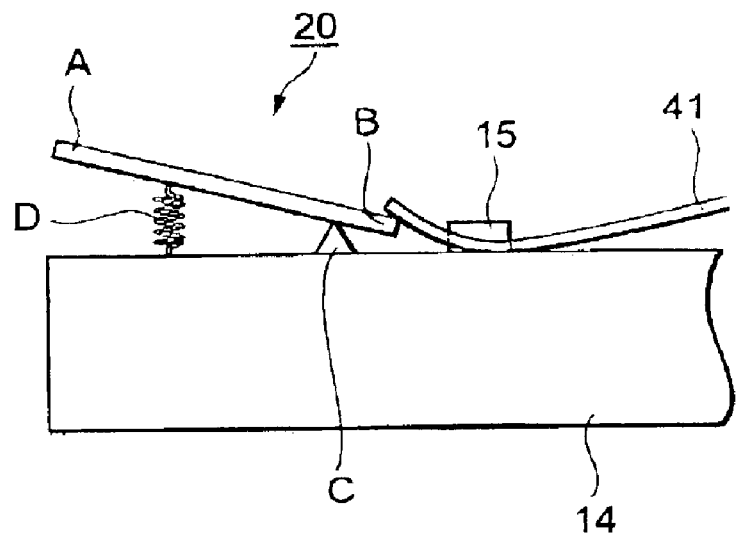
FIG. 3 is a diagram for explaining the principle of releasing the engagement by the lever.

The lever 20 for disengaging the hook 41 from the projection 15 will be described below. The mechanism of releasing the engagement between the projection 15 and the hook 41 by the lever 20 will be first described with reference to FIG. 3. FIG. 3 is a diagram for explaining this mechanism, from which the elements other than the elements necessary for the description are omitted. When the optical module 10 is fixed to the host board 40, as shown in FIG. 3, the hook 41 of the host board 40 engages with the projection 15 formed in the housing. The lever 20 makes use of the mechanism of lever action in order to lift the hook 41 up, and has a fulcrum C, a power point A where a force is affected, and a point of application B for lifting the hook 41 up. As the power point A moves toward the housing 14 with the force on the power point A, the point of application B moves in a leaving direction from the housing 14 with the movement of the power point A, so as to lift the hook 41 up.

Without any force on the power point A, the restoring device D keeps the point of application B of the lever 20 located nearer to the housing 14 than the top portion of the projection 15, so that the lever 20 can be prevented from obstructing the engagement between the projection 15 and the hook 41 in setting the optical module 10 into the host board 40. The above describes the mechanism of the lever 20 for releasing the engagement in the present invention.

Figure 4:
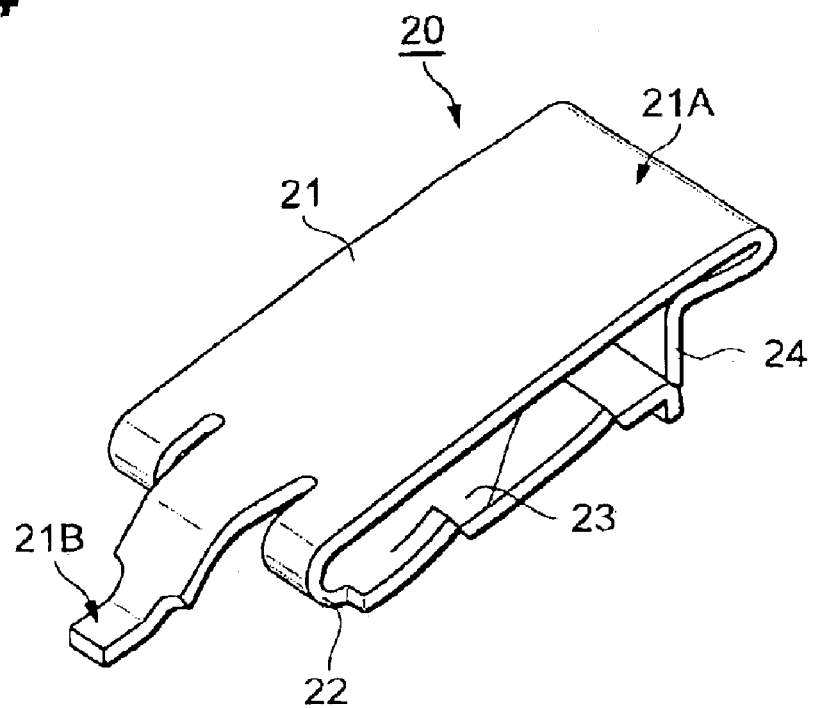
FIG. 4 is a perspective view showing the lever according to the first embodiment.
Figure 5:
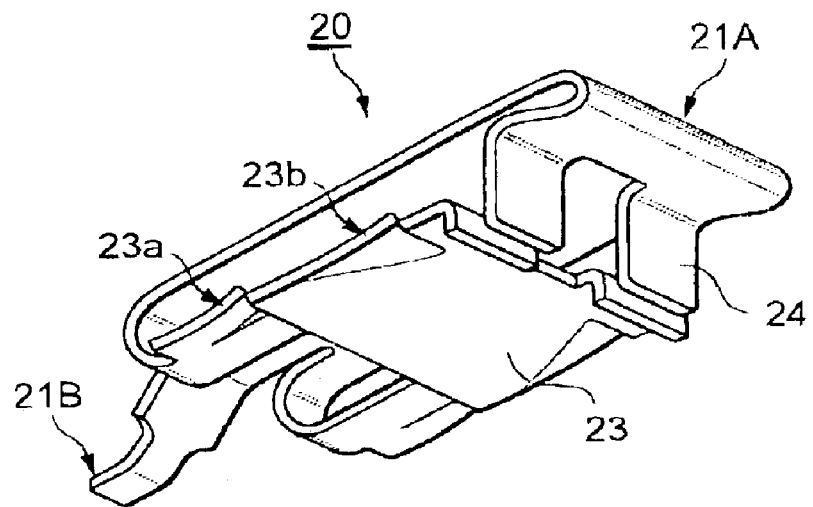
FIG. 5 is a perspective view showing the lever according to the first embodiment.
Figure 6:
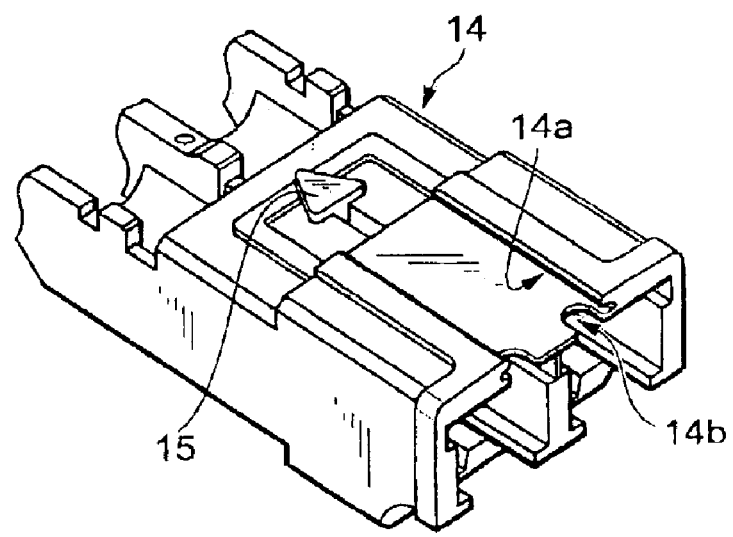
FIG. 6 is a perspective view showing part of the housing according to the first embodiment.
Figure 7:
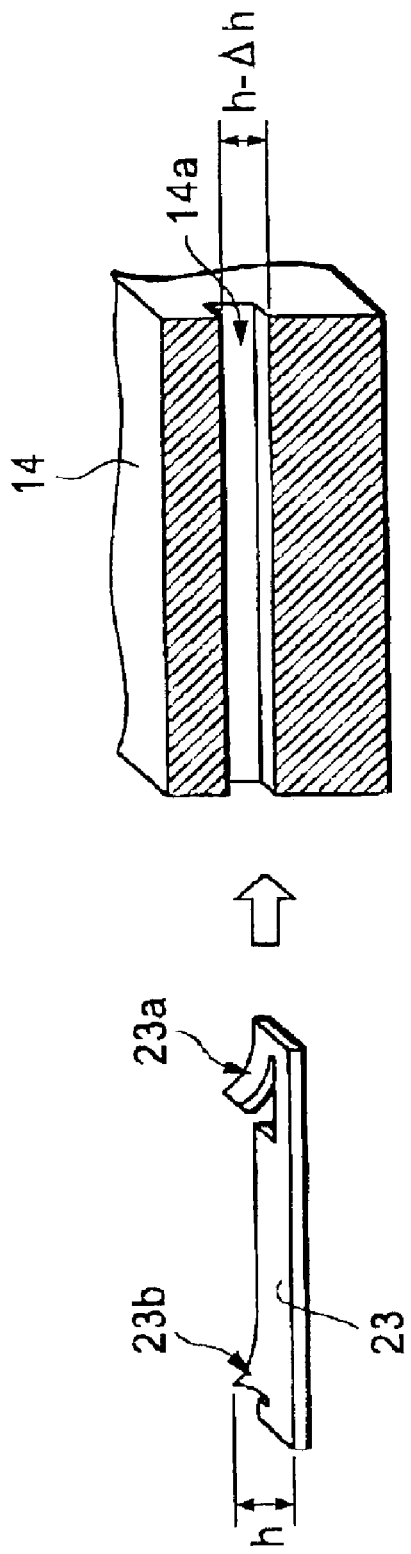
FIG. 7 is a diagram showing the principle of mounting the lever according to the first embodiment.

The lever 20 according to the embodiment will be described below. FIG. 4 is a perspective view showing the lever 20 according to the first embodiment. The lever 20 includes a platelike part 21, which has a first portion 21A as a power point and a second portion 21B as a point of application at its both ends, and a mounting part 23, which is formed by bending the platelike part 21. The lever 20 is made of metal with excellent mechanical properties, and the platelike part 21 and mounting part 23 are integrally formed. A curled part 22, which connects the mounting part 23 to the platelike part 21, functions as a fulcrum. FIG. 5 is a perspective view of the lever 20 from the side of optical module 10, in which each side of the mounting part 23 is bent at two positions to form bent portions 23a, 23b and in which the amount of the bend increases from the curled part 22 toward the free end. The bent portions 23a, 23b have a function of fixing the mounting part 23 to the housing 14. Grooves 14a for mounting of the lever 20 are formed in a portion of the housing 14 to which the lever 20 is mounted, as shown in FIG. 6. Supposing the maximum of the height of the bent portions 23a, 23b is h, the width of the grooves 14a is designed to a value (h−Δh) a little smaller than h. Notches 14b formed at an edge of the housing 14 are intended for allowing error-preventing pawls 24 to enter an optical connector receiving area. The fixing of the mounting part 23 into the grooves 14a will be described below with reference to FIG. 7. FIG. 7 is a diagram showing the relation between the bent portions 23a, 23b of the mounting part 23 and the grooves 14a. Inserting the mounting part 23 into the grooves 14a, the mounting part is inserted from the smaller bend amount side and thus the mounting part 23 smoothly moves into the grooves 14a. Once the mounting part 23 is inserted into the grooves 14a, the bent portions 23a, 23b will catch in the grooves if one tries to move the mounting part 23 backward (in the dismounting direction). The mounting part is efficiently fitted into the grooves 14a in this way, whereby the lever 20 is fixed to the housing 14.

Figure 8:
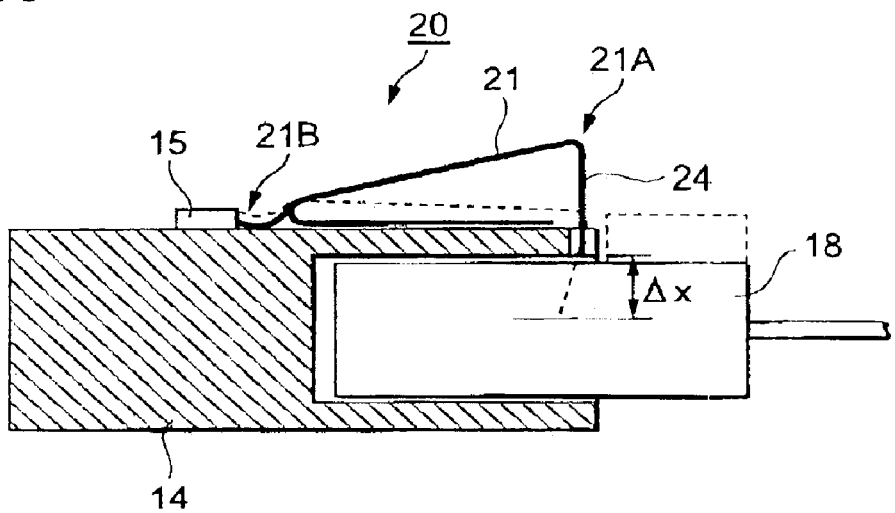
FIG. 8 is a diagram to explain the role of error-preventing pawls.

Referring again to FIG. 5, the first portion 21A is provided with the error-preventing pawls 24 extending toward the mounting part 23. The error-preventing pawls 24 have a function of preventing the optical module 10 from being dismounted from the host board 40 during an optical connector being inserted therein. The function of the error-preventing pawls 24 will be described with reference to FIG. 8. FIG. 8 is a view of the housing 14 and the lever 20 mounted on the housing 14 from the side of the optical module 10. The elements other than those necessary for the description of the function of the error-preventing pawls 24 are omitted from FIG. 8. The housing 14 is cut away on the fixing side of the lever 20 (cf. FIG. 6), so as to communicate with the connector-receiving area. The error-preventing pawls 24 are allowed to go into the connector-receiving area through the notches 14b. In FIG. 8, a dashed line indicates the position of the lever 20 with a force on the first portion 21A when the optical connector is not received. When the force is applied on the first portion 21A in the state when the optical connector 18 is not received, the first portion 21A moves toward the housing 14, as indicated by the dashed line in FIG. 8, and with this movement the second portion 21B moves in the leaving direction to disengage the hook 41 from the projection 15. When the optical connector 18 is received in the connector-receiving area, however, the error-preventing pawls 24 go into contact with the optical connector with the movement of the first portion 21A toward the housing 14, as shown in FIG. 8, so that the movement of the first portion 21A is restricted at the point of the contact between the error-preventing pawls 24 and the optical connector. This also results in restricting the movement of the second portion 21B, whereby the hook 41 is incapable of being disengaged from the projection 15. The length of the error-preventing pawls 24 can be set to a length enough to restrict the movement of the first portion 21A so as to prevent the second portion 21B from disengaging the hook 41. More specifically, supposing the hook 41 is disengaged when the lever 20 is located at the position indicated by the dashed line in FIG. 8 with the movement of the first portion 21A by Δx, the length of the error-preventing pawls 24 is determined so that the amount of displacement of the first portion 21A becomes smaller than Δx.

The function of the optical module 10 according to the first embodiment will be described below. The optical module 10 according to the first embodiment is provided with the lever 20 having the first portion 21A and the second portion 21B. The optical module 10 is configured so that the second portion 15 moves away from the housing 14 with movement of the first portion 21A toward the housing 14. Therefore, for pulling the optical module 10 out the host board 40, the user pinches the first portion 21A of the lever 20 whereupon the hook 41 engaging with the projection 15 is disengaged by the second portion 21B, to whereby the optical module 10 is smoothly dismounted from the host board 40.

Since the first portion 21A of the lever 20 is provided with the error-preventing pawls 24 extending to the area for reception of the optical connector 18, the motion of the lever 20 is restricted when the optical connector 18 is inserted in the optical module 10. This prevents the hook 41 from being accidentally disengaged from the projection 15 during the operation of the optical module 10. Since the mechanism of dismounting the optical module 10 of the conventional slide type actuator with no means for restricting the longitudinal motion, the optical module 10 was accidentally dismounted during the operation of the optical module 10. The optical module 10 according to the embodiment also has permitted control in this respect.

The optical module 10 according to the second embodiment of the present invention will be described next. The optical module 10 according to the second embodiment has nearly the same arrangement as the optical module 10 according to the first embodiment, but is different in the lever 30 for disengaging the hook 41 of the first embodiment.

Figure 9:
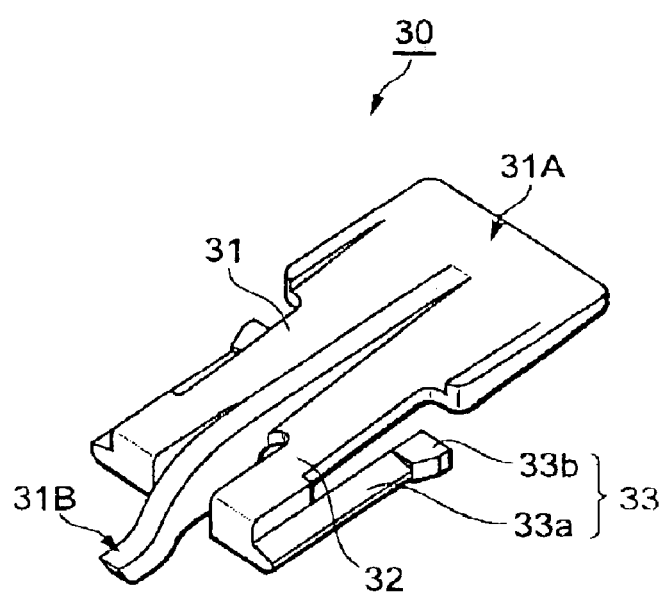
FIG. 9 is a perspective view showing the lever according to the second embodiment.

FIG. 9 is a perspective view showing the lever 30 of the optical module 10 according to the second embodiment. The lever 30 is made of plastic and includes the platelike part 31 having the first portion 31A as a power point and the second portion 31B as a point of application at its both ends, and the mounting part 33 formed by bending part of the platelike part 31. The platelike part 31 and mounting part 33 are integrally formed. The curled part 32, which connects the mounting part 33 to the platelike part 31, functions as a fulcrum. In this arrangement, the lever 30 acts so that the second portion 31B lifts the hook 41 up when the force is applied on the first portion 31A to move it. Just as in the case of the first embodiment, the first portion 31A is provided with the error-preventing pawls for preventing the optical module 10 from slipping off from the host board 40 in the coupled state of the optical connector 18 (not shown in FIG. 9).

Figure 10:
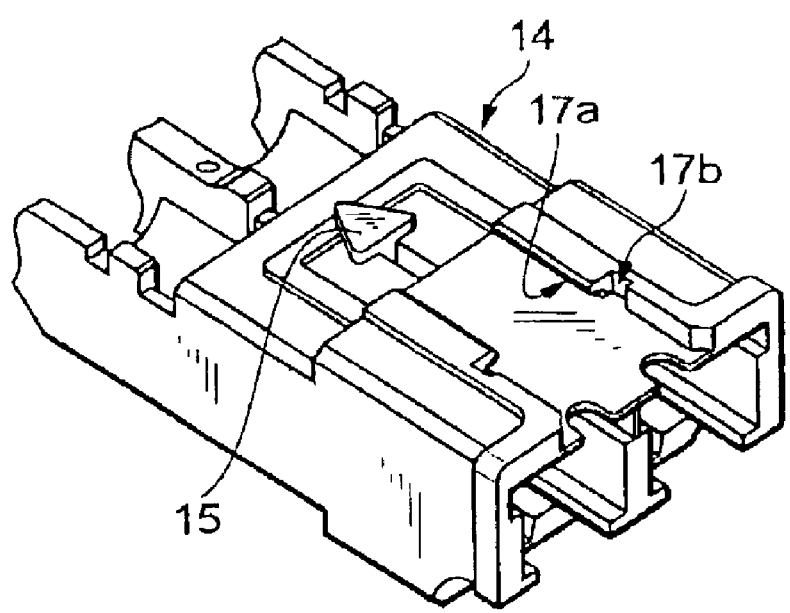
FIG. 10 is a perspective view showing part of the housing according to the second embodiment.
Figure 11A:
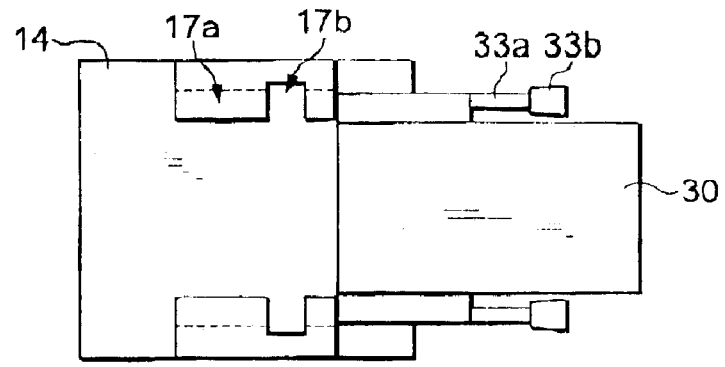
FIG. 11A is a diagram showing the manner of mounting the lever according to the second embodiment.
Figure 11B:
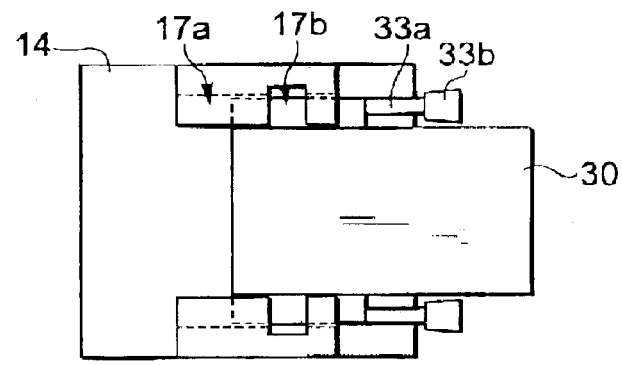
FIG. 11B is a diagram showing the manner of mounting the lever according to the second embodiment.
Figure 11C:
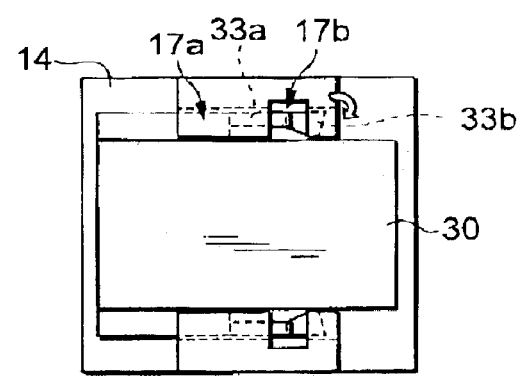
FIG. 11C is a diagram showing the manner of mounting the lever according to the second embodiment.
Figure 11D:
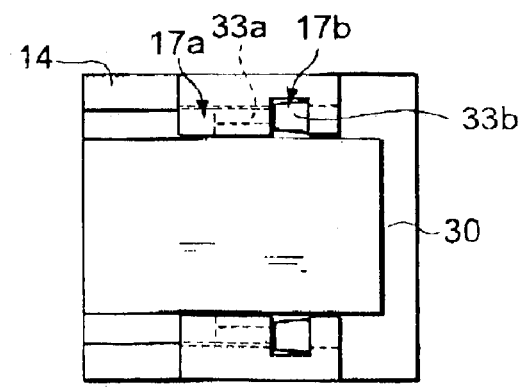
FIG. 11D is a diagram showing the manner of mounting the lever according to the second embodiment.

The mounting part 33 of the lever 30 has supporting guides 33a and dropout-preventing pawls 33b, and the lever 30 is mounted on the housing 14 by means of these elements. FIG. 10 is a perspective view showing part of the housing 14, in which supporting-guide-fitting grooves 17a to fit the supporting guides 33a are formed in a surface to which the lever 30 is fixed. The dropout-preventing-pawl butt faces 17b are formed in part of the grooves, as shown in FIG. 10. The mounting part 33 is brought into fit in the supporting-guide-fitting grooves 17a whereby the lever 30 is fixed to the housing 14. FIGS. 11A–11D are diagrams showing the manner of fitting the mounting part 33 into the supporting-guide-fitting grooves 17a step by step. First, as shown in FIGS. 11A and 11B, the retaining guides 33a of the lever 30 are slid from the end face of the housing 14 to be fitted into the supporting-guide-fitting grooves 17a. When the plastic dropout-preventing pawls 33b are fitted in the supporting-guide-fitting grooves 17a, the dropout-preventing pawls 33b are elastically deformed to be received in the supporting-guide-fitting grooves 17a, as shown in FIG. 11C. As the lever 30 is further slid, the dropout-preventing pawls 33b come up to the dropout-preventing-pawl butt faces 17b and the dropout-preventing pawls 33b elastically deformed return to the original state to be fitted against the butt faces 17b, as shown in FIG. 11D, whereby the lever 30 is fixed to the housing 14.

The function of the optical module 10 according to the second embodiment will be described below. The optical module 10 according to the present embodiment is provided with the slidable lever 30 having the first portion 31A and the second portion 31B is configured that the second portion 31B moves away from the housing 14, as the first portion 31A toward the housing 14. The user pinches the first portion 31A of the lever for pulling the optical module 10 out the host board 40 so as to disengage the hook 41, whereby the optical module 10 can be smoothly dismounted from the host board 40.

Since the first portion 31A of the lever 30 is provided with the error-preventing pawls extending toward the connector-receiving area, the motion of the lever 30 is restricted when the optical connector is inserted in the optical module 10. This prevents the hook 41 from being accidentally disengaged from the projection 15 during the operation of the optical module 10.

Since the lever 30 is made of plastic, it can be readily colored. This permits types of optical modules 10 to be distinguished from each other by colors of levers 30. Since optical modules 10 are often integrated in high density in the host board 40, it is convenient to permit the identification of types of optical modules by colors.

Figure 12:
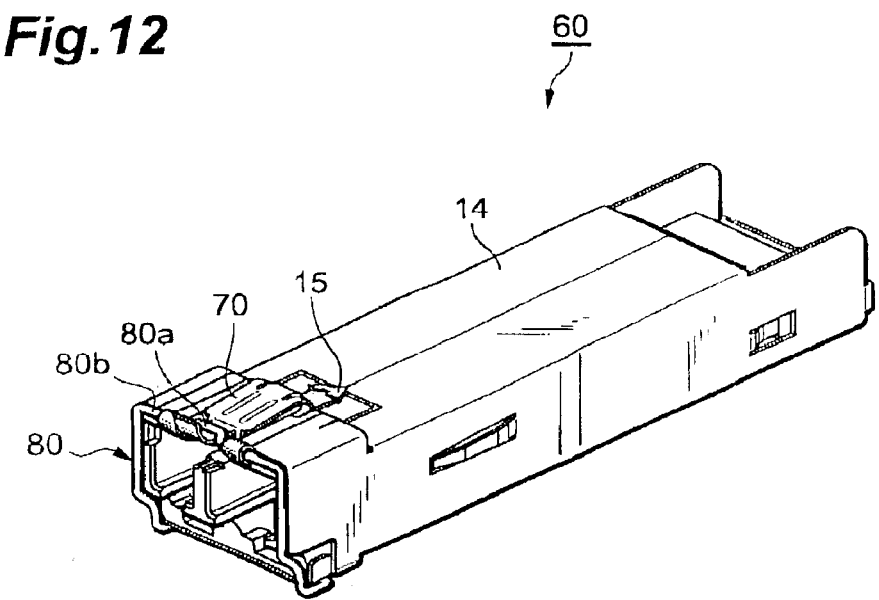
FIG. 12 is a perspective view showing the optical module according to the third embodiment.

The optical module 60 according to the third embodiment of the present invention will be described next. FIG. 12 is a perspective view of the optical module 60 according to the third embodiment, viewed from the lever mounting surface side. As shown in FIG. 12, the optical module 60 according to the third embodiment has the projection 15 formed in the module body, the lever 70 mounted adjacent to the projection 15, and an actuating member 80 to move the first portion 71A of the lever 70 toward the module body.

The projection 15 has a function of engaging with the hook provided on the host board.

Figure 13:
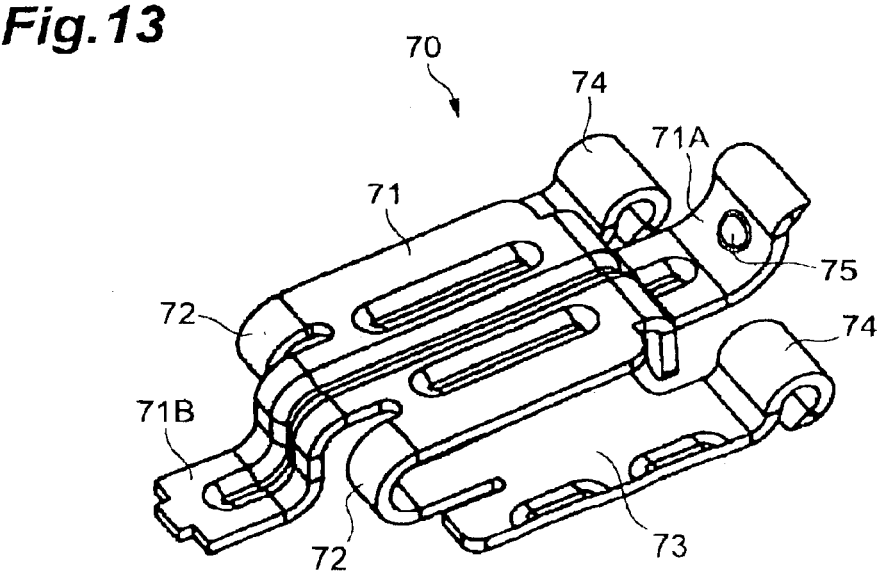
FIG. 13 is a perspective view showing the lever according to the third embodiment.

FIG. 13 is a perspective view showing the lever 70. The lever 70 includes the platelike part 71 having the first portion 71A as a power point and the second portion 71B as a point of application, and the mounting part 73 formed by bending part of the platelike part 71. The lever 70 is made of metal with excellent mechanical properties, and the platelike part 71 and mounting part 73 are formed integrally. The curled part 72, which connects the mounting part 73 to the platelike part 71, serves as a fulcrum. The mounting part 73 is bent at two positions to form actuator-supporting parts 74 rotatably supporting an axis part 80b of the actuating member 80. The first portion 71A extends nearly in parallel with the mounting part 73 and the distal end thereof is rounded in the direction away from the mounting part 73. The first portion 71A is formed so as to be located nearer to the mounting part 73 than the axis part 80b which will be set through the actuator-supporting parts 74.

The actuating member 80, as shown in FIG. 12, is an annular shaped member surrounding an optical connector insertion slot and having the shape almost along the edge of the end face of the optical module 60. A portion of the actuating member 80 along the edge of the lever mounting surface constitutes the axis part 80b. A grip part 80c is formed in a portion of the actuating member 80 along the edge of the surface opposed to the lever mounting surface. A sliding contact part 80a projecting in the insertion direction of the optical connector is formed near the central region of the axis part 80b. The actuating member 80 is rotatably mounted on the lever 70 while the axis part 80b thereof is set through the actuator-supporting parts 74 of the mounting part 73. The axis part 80b is supported at two positions on the both sides of the sliding contact part 80a by the actuator-supporting parts 74 of the lever 70. The actuating member 80 is mounted on the lever 70 in the present embodiment, whereas the actuating member 80 may be mounted on the module body.

Figure 14A:
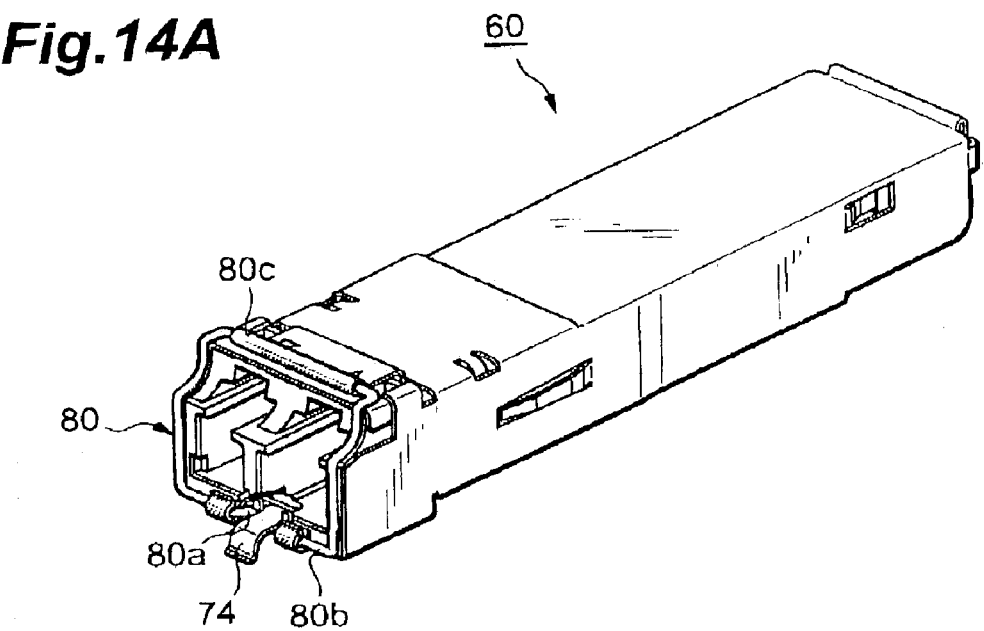
FIG. 14A is a diagram showing the manner of rotation of the actuating member.
Figure 14B:
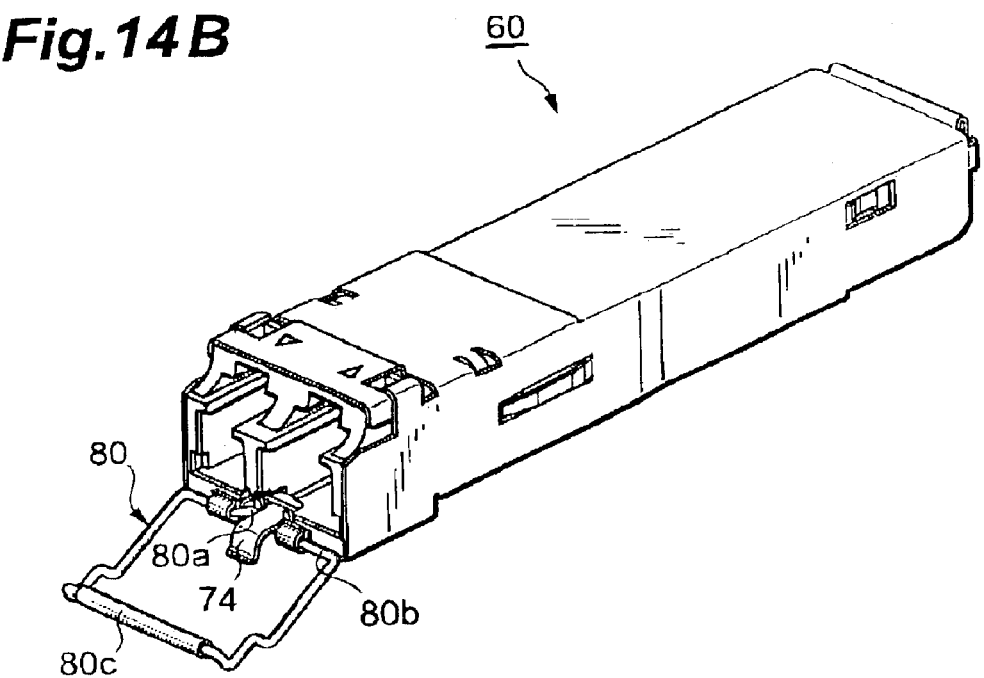
FIG. 14B is a diagram showing the manner of rotation of the actuating member.

The rotation of the actuating member 80 will be described below with reference to FIGS. 14A and 14B. FIG. 14A and FIG. 14B are perspective views of the optical module 60 viewed from the side of the surface opposite to the lever mounting surface. For inserting the optical connector, as shown in FIG. 14A, the actuating member 80 is set to adjoin the optical connector insertion slot so as to clear the space in front of the optical connector insertion slot. For dismounting the optical module 60 from the host board, the actuating member 80 is rotated to locate the grip part 80c on the same plane as the lever mounting surface, as shown in FIG. 14B. In the description hereinafter, the position of the actuating member 80 shown in FIG. 14A will be referred to as "first position," and the position of the actuating member 80 shown in FIG. 14B as "second position."

Figure 15A:
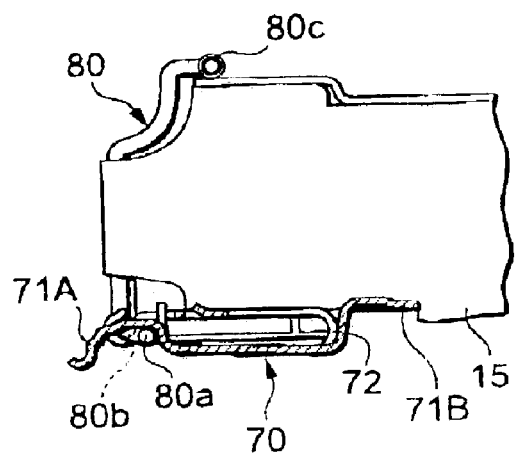
FIG. 15A is a diagram to explain the mechanism of pivotally moving the lever by the actuating member.
Figure 15B:
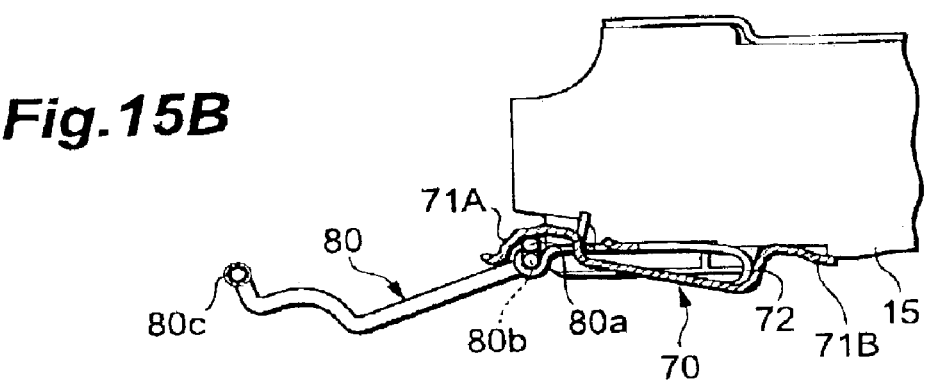
FIG. 15B is a diagram to explain the mechanism of pivotally moving the lever by the actuating member.
Figure 15C:
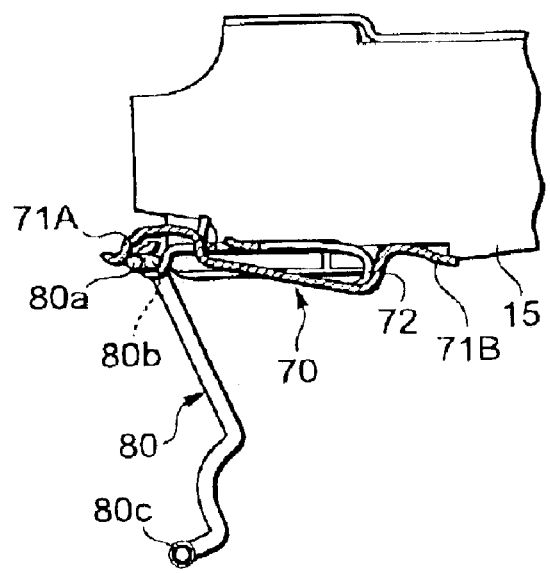
FIG. 15C is a diagram to explain the mechanism of pivotally moving the lever by the actuating member.
Figure 16:
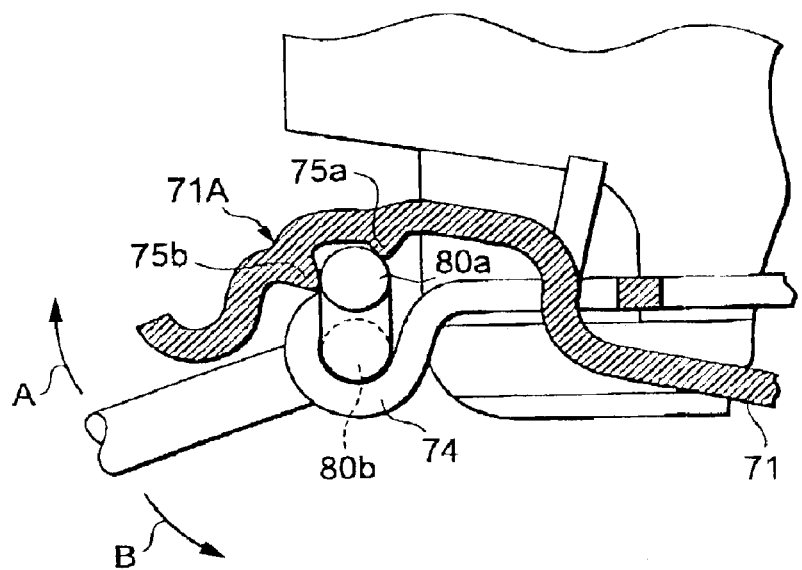
FIG. 16 is a diagram to explain the projections formed in the first portion of the lever.

Subsequently, the operation of the actuating member 80 and lever 70 will be described with reference to FIGS. 15A and 15B. With the lever at the first position, as shown in FIG. 15A, the lever 70 is located by the restoring force of the curled part 72 so that the second portion 71B is lower than the top portion of the projection 15 (on the module body side), and the hook not shown is in engagement with the projection 15. The grip part 80c of the actuating member 80 is then moved away from the optical connector insertion slot to rotate the actuating member 80, whereupon the sliding contact part 80a of the actuating member 80 rotates about the axis part 80b (counterclockwise in the figure) with the rotation of the actuating member. This motion rotationally moves the sliding contact part 80a toward the module body (upward in FIG. 15B) and the sliding contact part 80a slides on the first portion 71A of the lever 70, so as to push the first portion 71A toward the module body. This pivotally moves the lever 70 about the curled part 72, so that the second portion 71B of the lever 70 moves upward, as shown in FIG. 15B. Then the second portion 71B pushes up the hook (not shown) engaging with the projection 15, to disengage the hook from the projection 15. FIG. 16 is a partly enlarged view showing an enlarged contact state between the sliding contact part 80a and the first portion 71A. As shown in FIG. 16, with the actuating member 80 at the second position, the sliding contact part 80a of the actuating member 80 engages with a projection 75a formed in the first portion 71A, so as to restrict the rotation of the actuating member 80 in the direction of arrow A in FIG. 16. This prevents the actuating member 80 from returning to the first position because of the restoring force of the lever 70. When a force over a prescribed level is applied on the grip part 80c, the sliding contact part 80a climbs over the projection 75a, so that the actuating member 80 can be returned to the first position. The sliding contact part 80a of the actuating member also engages with a projection 75b formed in the first portion 71A, so as to restrict rotation of the actuating member 80 in the direction of arrow B in FIG. 16. This restricts the rotation of the actuating member 80 with the grip part 80c at the second position on the same plane as the lever mounting surface. This makes the user conscious that the optical module can be drawn by pulling the grip part 80c at the second position. Furthermore, the sliding contact part 80a can climb over the projection 75b, so that the actuating member 80 can be rotated in the direction opposite to the first position, as shown in FIG. 15C. This mechanism can prevent the failure such as detachment of the actuating member 80 with application of a downward force on the grip part 80c at the position of FIG. 15B. The first portion 71A in slide contact with the sliding contact part 80a is so curved that the second portion 71B can be maintained at the position of the top portion of the projection 15 during the rotation of the actuating member 80 up to the state shown in FIG. 15C.

Figure 17A:
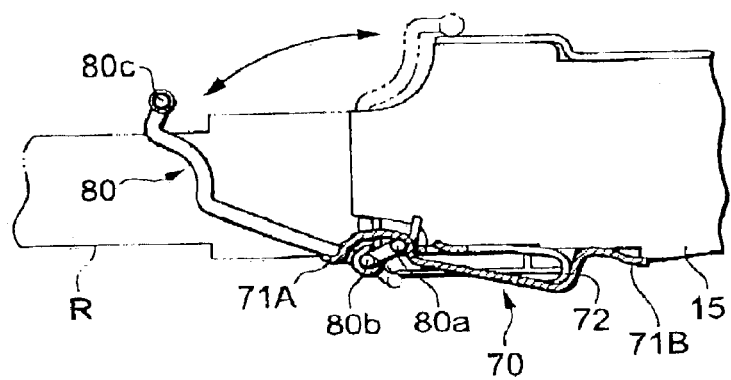
FIGS. 17A and 17B are diagrams to explain the angle of rotation of the actuating member on the occasion of releasing the engagement between the projection and the hook.
Figure 17B:
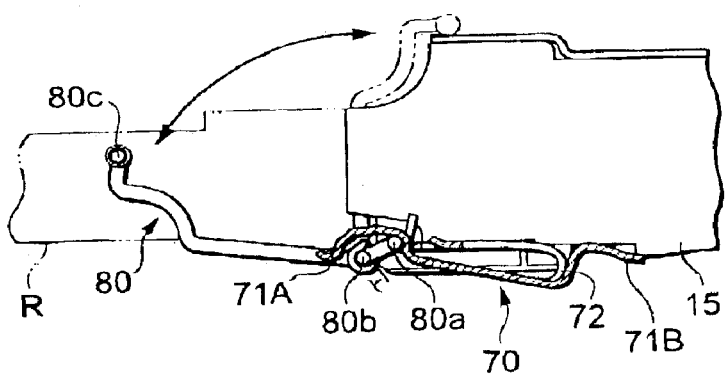

The following will describe the angle of rotation of the actuating member 80 during the disengagement of the hook 41 from the projection 15. FIG. 17A and FIG. 17B are diagrams showing positions of the actuating member 80 during the disengagement of the hook 41 from the projection 15.

The actuating member 80 rotates away from the optical connector insertion slot from the state in which the grip part 80c is adjacent to the optical connector insertion slot, as described above. In the example shown in FIG. 17A, before the grip part 80c reaches an area R occupied by the optical connector to be inserted, the second portion 71B moves up to the top portion of the projection 15, so as to release the engagement between the projection 15 and the hook 41. The angle of rotation of the actuating member 80 with the grip part 80c arriving at the area R can be calculated from the height of the end face of the optical module 60, the height of the optical connector, and so on. The amount of rotation is 68° in the case of standard optical modules. Therefore, the optical module is designed so that the engagement between the hook 41 and the projection 15 is released at the rotation angle of not more than 68°. In the example shown in FIG. 17B, when the grip part 80c moves into the area R or when it is rotated over the area R, the second portion 71B moves up to the top portion of the projection 15 to release the engagement between the projection 15 and the hook 41. In this case, the optical module is designed so that the engagement between the hook 41 and the projection 15 is released at the rotation angle of greater than 68°. In the optical module 60 according to the present embodiment, the rotation angle of the actuating member 80 upon the disengagement can be designed as shown in each of FIGS. 17A and 17B. The rotation angle of the actuating member 80 can be changed, for example, by a method of changing the angle of the sliding contact part 80a relative to the position of the grip part 80c, by a method of changing the degree of curvature of the first portion 71A on which the sliding contact part 80a slides, etc., as shown in FIGS. 17A and 17B.

The example of releasing the engagement before the grip part 80c arrives at the area R (cf. FIG. 17A) has the advantage that the hook 41 engaging with the projection 15 can be disengaged in the state in which the optical connector is inserted in the optical module 60. Normally, an optical connector, when dismounted from the optical module 60, needs to be cleaned before inserted again, but using of this arrangement permits the optical module 60 to be dismounted from the host board 40 when the optical connector is inserted in the optical module 60. In this arrangement that the hook 41 is disengaged in the inserted state of the optical connector, the lever is not provided with the pawls 24 for restricting the movement of the first portion 21A, which were described in the first and the second embodiment. In the example that the engagement is released when the grip part 80c moves into the connector occupying area R (cf. FIG. 17B) or rotates over the connector occupying area R, the grip part 80c goes into contact with the inserted optical connector when the optical connector is inserted in the optical module 60, so that the optical module 60 cannot be drawn out of the host board 40 in the connector inserted state. Namely, it is feasible to prevent such an accident that the optical module 60 is accidentally slipped off from the host board 40 during the operation in which signal light flows through the optical connector. In the examples of FIGS. 17A and 17B, the design of actuating member 80 can be determined depending upon environments in which the optical module 60 is used. For example, the actuating member 80 of the error-preventing type as shown in FIG. 17B is suitably applicable where the optical module is used in such environments that the optical module 60 must be prevented from being drawn during the operation, like the backbone part. Conversely, the actuating member 80 of the type as shown in FIG. 17A to permit insertion into and removal from the host board 40 even in the inserted state of the optical connector is suitably applicable to the case where it is used in such environments that switching is often carried out, for example, like switching portions.

Figure 18A:
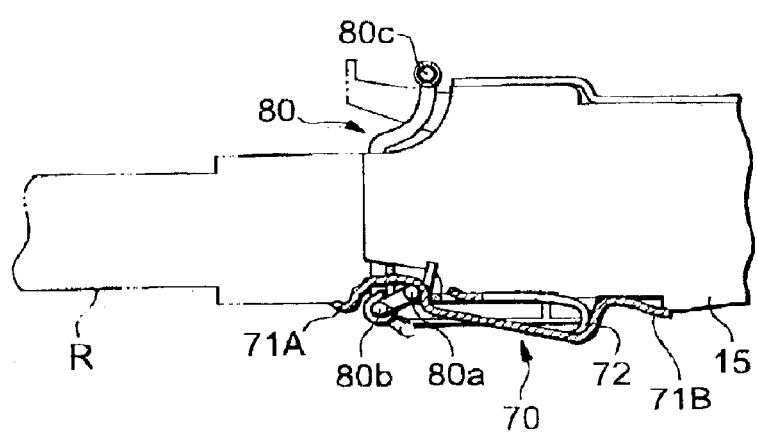
FIG. 18A is a diagram to explain the angle of rotation of the actuating member on the occasion of releasing the engagement between the projection and the hook.
Figure 18B:
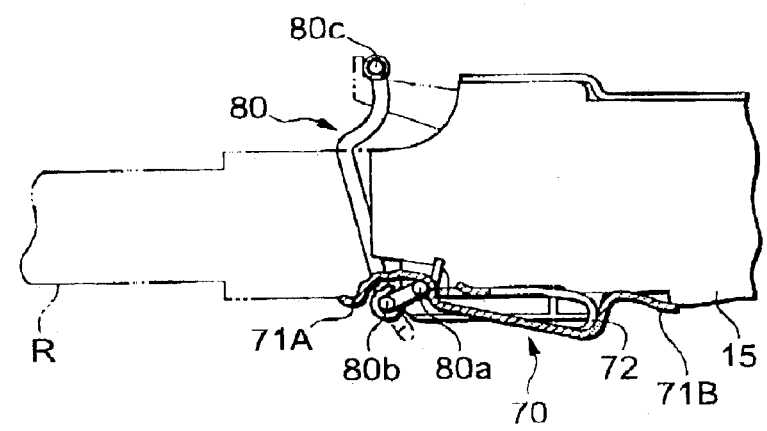
FIG. 18B is a diagram to explain the angle of rotation of the actuating member on the occasion of releasing the engagement between the projection and the hook.

Although not illustrated in FIGS. 17A and 17B, the connector occupying area R stated in the present invention also includes an optical plug for connecting the optical connector to the optical module 60. Namely, the rotation of the grip part 80c can be restricted by decreasing the radius of rotation of the grip part 80c as shown in FIG. 18A and by letting the grip part 80c hit the optical plug halfway of the rotation of the actuating member as shown in FIG. 18B. This arrangement can prevent the erroneous operation of dropout of the optical connector in the state in which the optical connector is inserted.

Figure 19A:
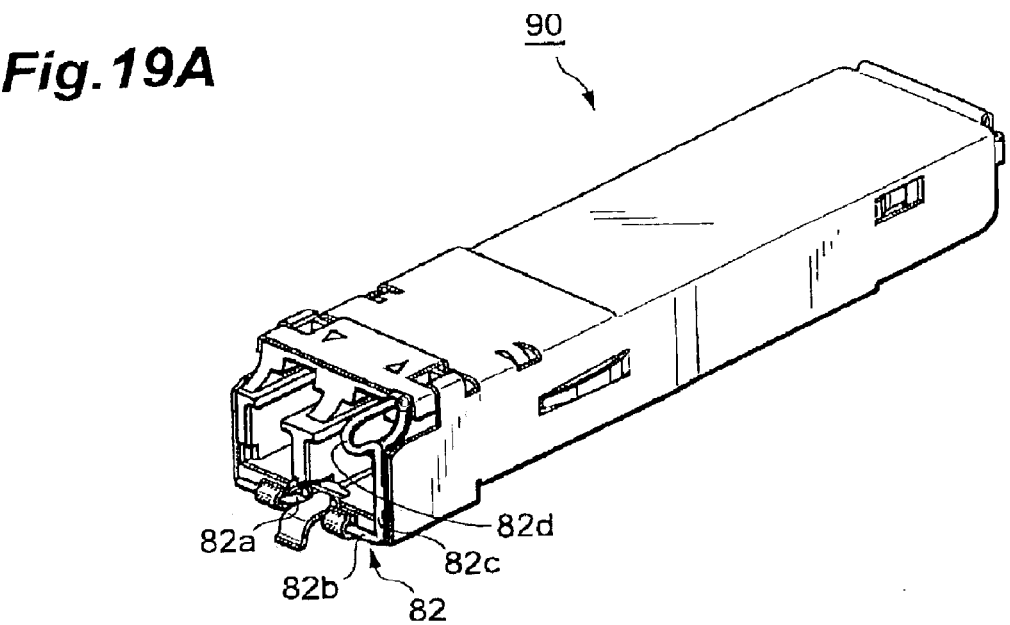
FIG. 19A is a diagram showing the arrangement of the optical module according to the fourth embodiment.
Figure 19B:
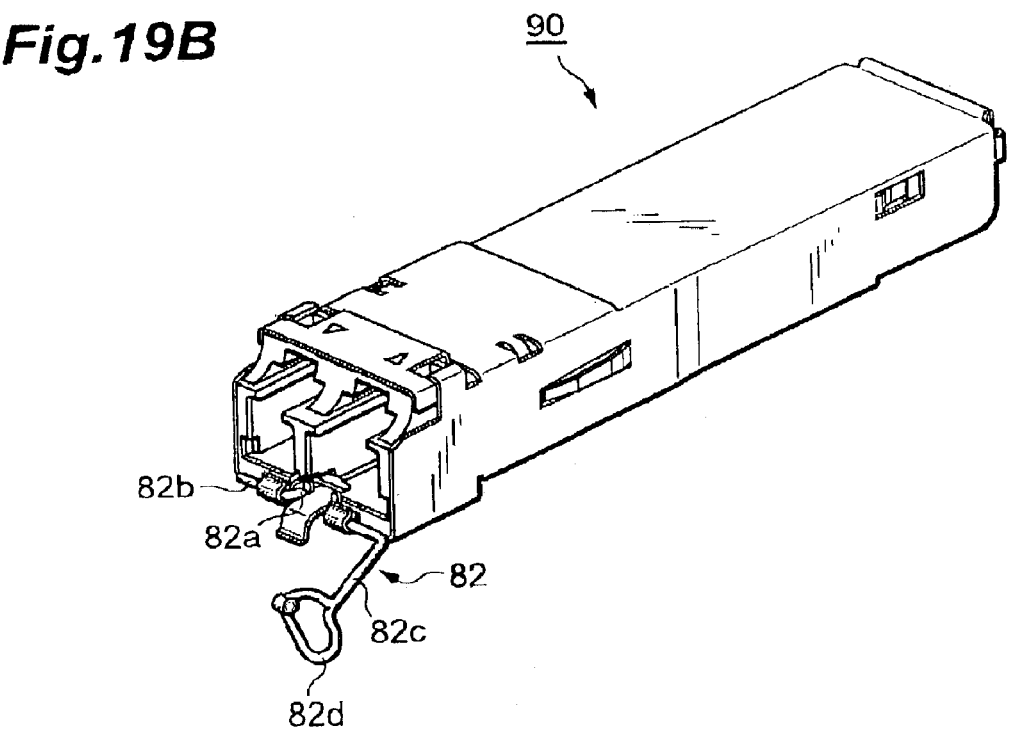
FIG. 19B is a diagram showing the arrangement of the optical module according to the fourth embodiment.
Figure 20:
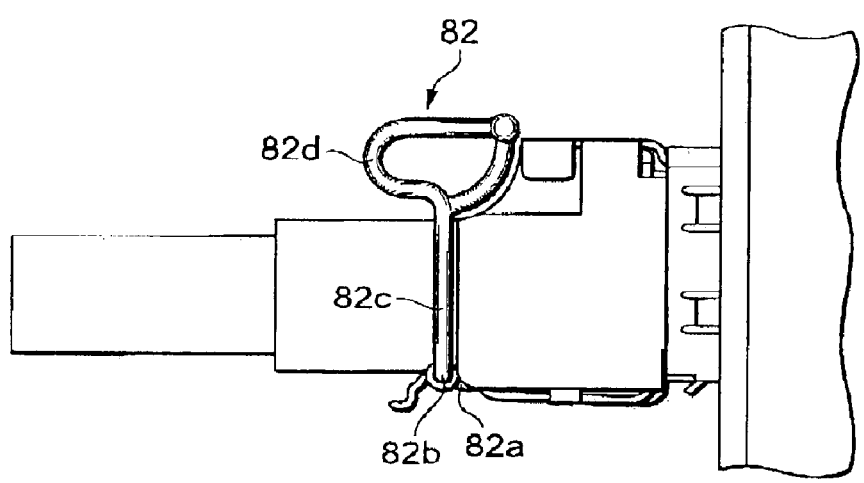
FIG. 20 is a diagram showing the actuating member used in the optical module according to the fourth embodiment.

The optical module 90 according to the fourth embodiment of the present invention will be described below. The optical module 90 according to the fourth embodiment has the actuating member 82, as the optical module 60 according to the third embodiment did, but the shape of the actuating member 82 is different. FIGS. 19A and 19B are perspective views showing the optical module 90 according to the fourth embodiment, and FIG. 20 a diagram showing the actuating member 82 of the optical module 90 according to the fourth embodiment. As shown in FIG. 19A, the actuating member 82 has the axis part 82b along the edge of the lever mounting surface of the optical module 90, and the grip part 82c being normal to the axis part 82b and along the edge of the optical connector insertion slot. A stick 82d protruding from the end face in the direction opposite to the connector insertion direction is formed on the far side from the axis part 82b of the grip part 82c, as shown in FIG. 20. As shown in FIG. 19B, the actuating member 82 is arranged to rotate about the axis part 82b as a center. When this arrangement is used, the grip part 82c never enters the area occupied by the optical connector to be inserted and the rotation of the actuating member 82 is not regulated by contact of the grip part 82c with the optical connector. Therefore, the hook 41 engaging with the projection 15 can be disengaged when the optical connector is inserted, and the optical module 90 can be dismounted from the host board 41. The stick 82d formed in the grip part 82c and protruding in the opposite direction to the connector insertion direction from the end face of the optical module 90 functions as a "handle." Namely, the actuating member 82 can be readily rotated by placing a finger on the stick 82d and pulling the grip part 82c.

Figure 21:
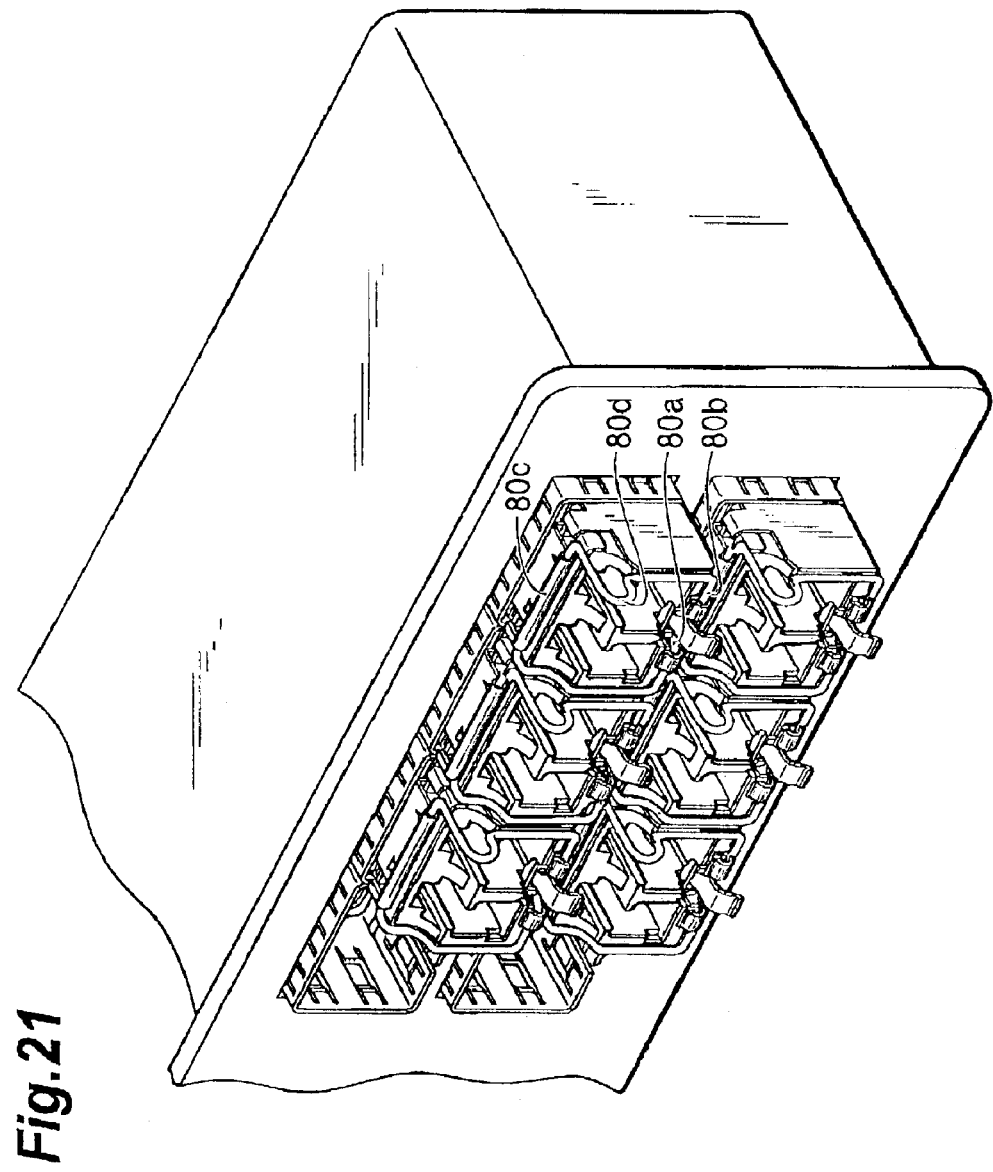
FIG. 21 is a diagram showing an example of the actuating member with a protrusion in the grip part.

The arrangement of providing the grip part with the protrusion can also be applied to the actuating member 80 according to the third embodiment. FIG. 21 is a diagram showing a state in which a plurality of optical modules 60 each having the actuating member 80 with the stick 80d are inserted in the host board 40. The stick 80d protruding from the end face of each optical module 60 is formed at one end of the grip part 80c. Since the stick 80d thus formed, the actuating member 80 can be readily rotated even in the case where optical modules 60 are integrated in high density as shown in FIG. 21. It can also be considered that stick 80d are formed at the both ends of grip part 80c, but the arrangement wherein the stick 80d is formed only at one end as shown in FIG. 21 is better, because an adjacent actuating member 80 is prevented from rotating together during rotation of a certain actuating member 80.

Figure 22:
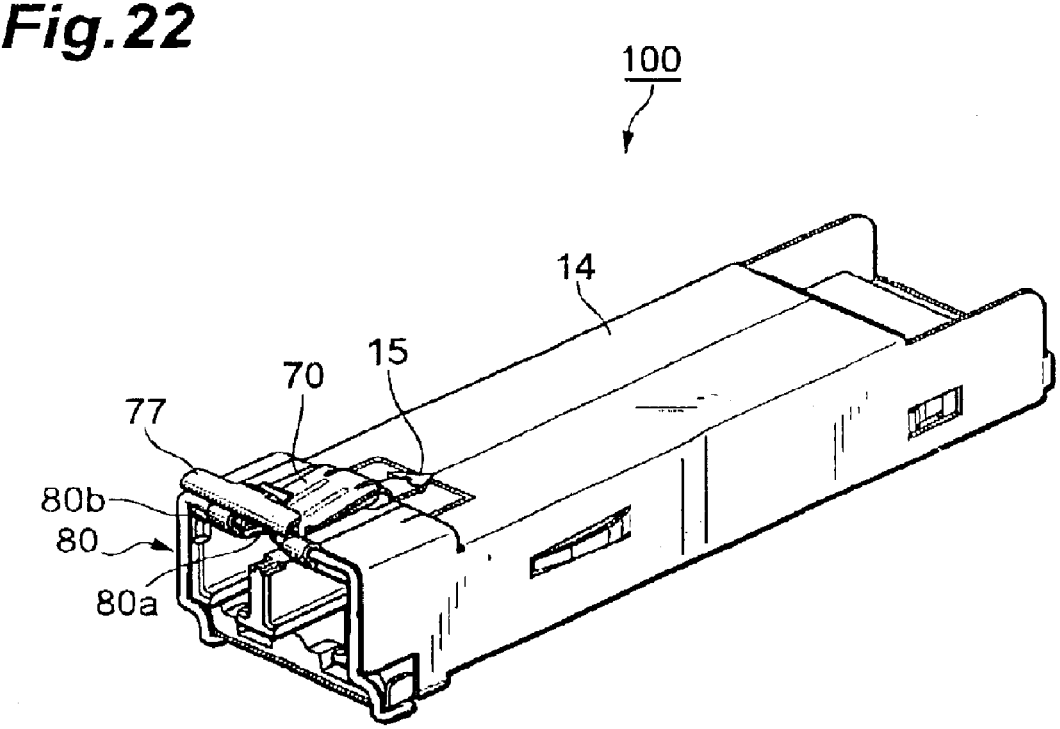
FIG. 22 is a perspective view showing the arrangement of the optical module according to the fifth embodiment.
Figure 23:
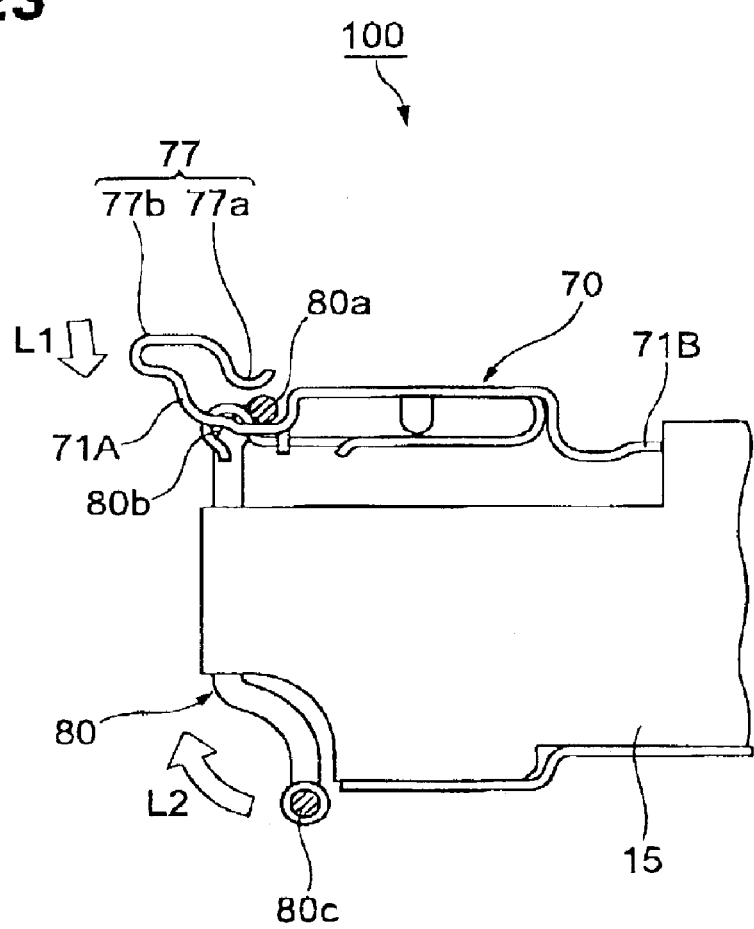
FIG. 23 is a diagram showing the arrangement of the optical module according to the fifth embodiment.
Figure 24:
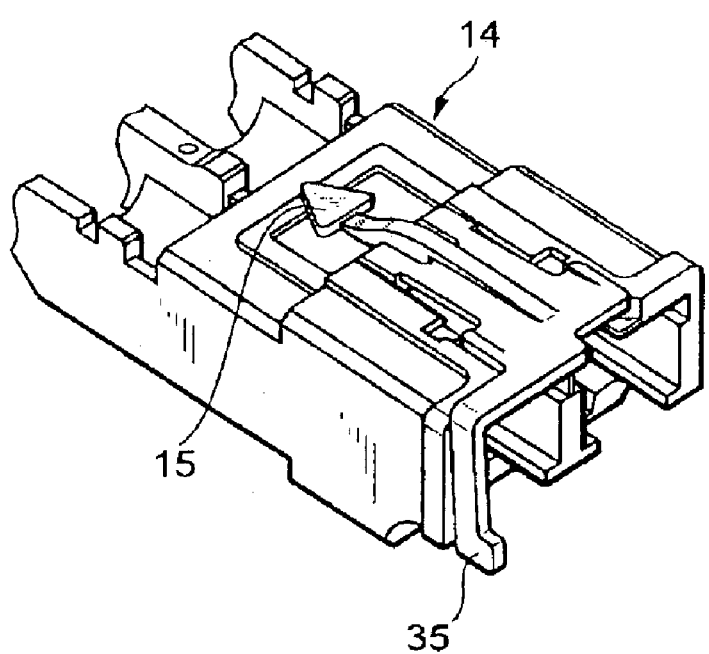
FIG. 24 is a diagram showing a modification example of the lever.

The optical module 100 according to the fifth embodiment of the present invention will be described below. FIG. 22 is a perspective view showing the optical module 100 according to the fifth embodiment, and FIG. 23 a sectional view showing the optical module 100 according to the fifth embodiment. The optical module 100 according to the fifth embodiment has the same fundamental structure as the optical module 70 according to the third embodiment did, but is different in that it has a handle 77 for moving the sliding contact part 80a of the actuating member 80. As shown in FIG. 23, the handle 77 is integral with the lever 70 and the handle 77 continuously extends from the first portion 71A of the lever. The handle 77 has a contact part 77a to contact the sliding contact part 80a, and a holding part 77b to make a force act on the handle 77. The handle 77 is formed by folding back part of the lever 70 extending opposite to the insertion direction of the optical connector, and the region near the folded part serves as the holding part 77b. Although the present embodiment described the example in which the handle 77 and lever 70 were integrally formed, the handle 77 and the lever 70 may be constructed of different parts.

The optical module 100 according to the fifth embodiment also has the function of readily releasing the engagement between the hook 41 and the projection 15 through rotation of the actuating member 80, as the optical module 100 according to the third embodiment did, and also has the following function because of the provision of the handle 77. It is difficult to place a finger on the grip part 80c of the actuating member 80 when optical modules 100 are integrated in high density as shown in FIG. 21. When the optical modules each are provided with the handle 77 projecting from the end face of the optical module 100 like the optical module 100 according to the fifth embodiment, the user can readily manipulate the grip part 80c. Namely, the user moves the handle 77 in the direction of arrow L1, so that the contact part 77a of the handle 77 pushes the sliding contact part 80a of the actuating member 80 toward the module body 15, whereby the actuating member 80 rotates in the direction of arrow L2 about the axis part 80b. Then the grip part 80c moves in the direction opposite to the connector insertion direction, and thus the grip part 80c becomes able to be readily manipulated.

Since the optical module 100 according to the fifth embodiment is constructed in the structure wherein the lever 70 and handle 77 are integral and wherein the handle 77 extends from the first portion 71A of the lever 70, the movement of the lever 70 in the direction of arrow L1 results in moving the first portion 71A of the lever 70 toward the module body 15, and this motion can support the disengagement of the hook 41 from the projection 15.

The above described the optical modules of the present invention with the embodiments thereof, but it is noted that the optical modules according to the present invention are not limited to the above embodiments.

The first embodiment or second embodiment described the arrangement that the first portion 21A, 31A on which the force was applied was located in the central region of the optical module 10, but it is also considered that a handle 35 with an operation part at the position apart from the center of the optical module 10 is attached to the lever and the lever is manipulated by means of this handle 35. In this arrangement wherein the force-applied part is set apart from the center of the optical module 10, the user can readily apply the force to the lever, whereby operability is improved, even in the case where a plurality of optical modules 10 are integrated, in which lever-mounted surfaces face each other.

Figure 25A:
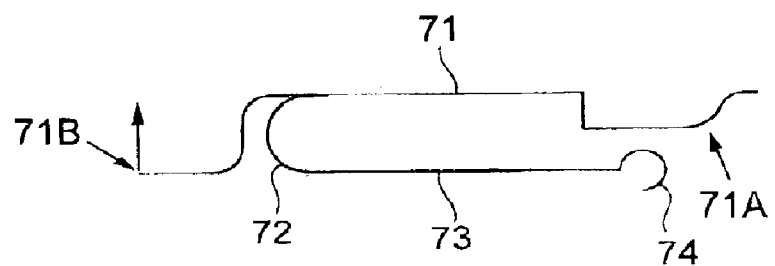
FIG. 25A is a diagram to explain displacement of the first portion and second portion of the lever.
Figure 25B:
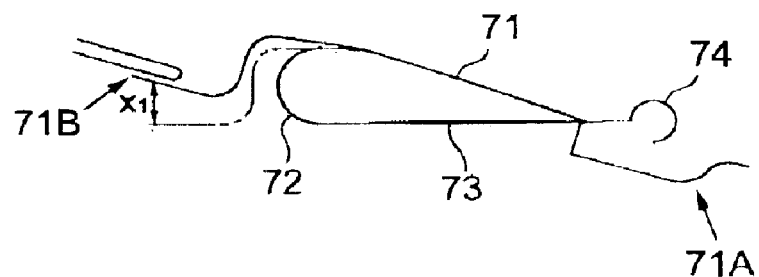
FIG. 25B is a diagram to explain displacement of the first portion and second portion of the lever.
Figure 26A:
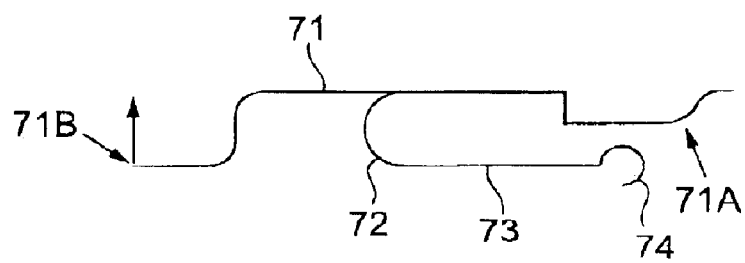
FIG. 26A is a diagram showing an example of the lever with the curled portion at a different position.
Figure 26B:
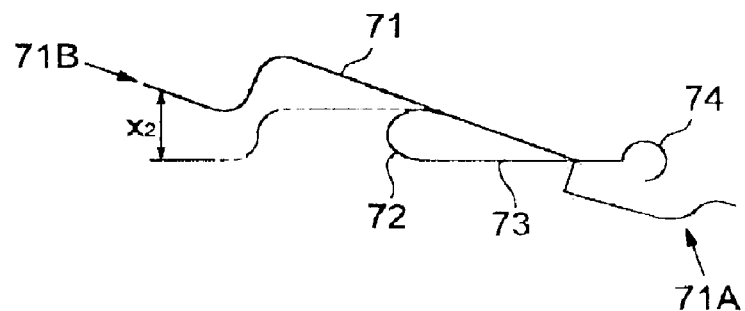
FIG. 26B is a diagram showing an example of the lever with the curled portion at a different position.
Figure 27A:
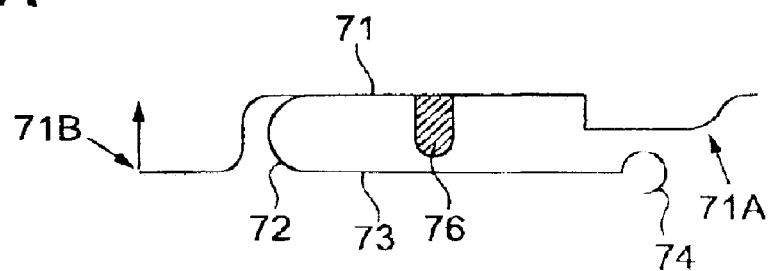
FIG. 27A is a diagram showing an example of the lever with a rib formed in the platelike part.
Figure 27B:
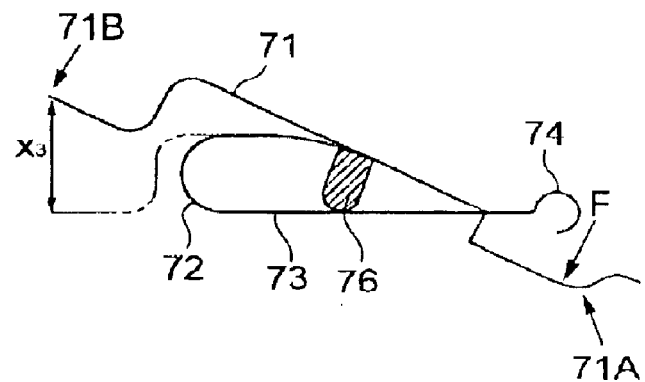
FIG. 27B is a diagram showing an example of the lever with a rib formed in the platelike part.
Figure 27C:
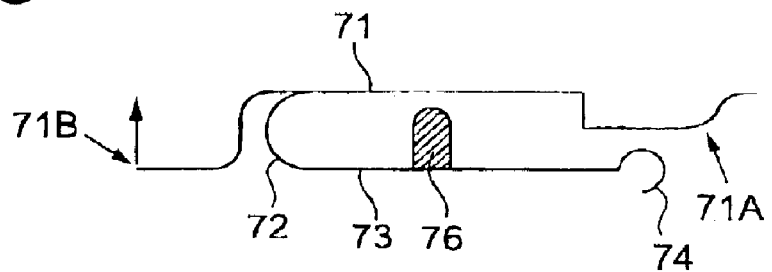
FIG. 27C is a diagram showing an example of the lever with a rib formed in the mounting part.

The pivotable lever described in the above embodiments is just an example of the lever implementing the present invention, and a variety of arrangements can be considered for the lever to disengage the hook 41 from the projection 15 with application of the force toward the body of the optical module 10. The lever pivotably moves about the curled part in the above embodiments, and the position of the curled part can be changed in order to vary the amount of displacement of the second portion relative to displacement of the first portion. Specifically, FIG. 25A is a diagram showing the lever 70 in the third embodiment, and when the force F is exerted on the first portion to push the first portion 71A down, the second portion 71B is displaced by X1 as shown in FIG. 25B. In contrast to it, in a arrangement that the location of the curled part 72 is set nearer to the first portion 71A as shown in FIG. 26A, when the force F is applied on the first portion 71A to push the first portion 71A down, the second portion 71B is displaced by X2 (X1<X2) as shown in FIG. 26B, whereby the hook can be disengaged by the smaller displacement of the first portion 71A. It can also be considered that a rib 76 is formed in the platelike part 71 between the curled part 72 and the first portion 71A, without changing the position of the curled part 72, as shown in FIG. 27A. In this arrangement, when the force F is applied on the first portion 71A to push the first portion 71A down, the rib 76 goes into contact with the lever mounting surface or mounting part 73 to pivotally move the platelike part 71 about the contact part as a center, and, as shown in FIG. 27B, the second portion 71B is displaced by X3 (X1<X3). In this case, the stiffness of the second portion 71B is maintained unchanged in long period, whereby the hook can be disengaged. Furthermore, the rib 76 may be formed in the mounting part 73 or in the module body as shown in FIG. 27C.

According to the present invention, the optical module has the lever pivotable relative to the module body, and, when the first portion of this lever is moved toward the module body, the second portion adjacent to the projection moves upward to disengage the hook engaging with the projection. Namely, the hook is disengaged by moving the first portion toward the module body, i.e., by moving the first portion in the direction of the force applied for holding the module body, so that the workability can be enhanced in the disengagement of the optical module.

In the arrangement that the optical module has the actuating member including the sliding contact part slidingly contacting the first portion of the lever and being rotatable about the axis part adjacent to the sliding contact part and that the actuating member is rotated to move the first portion of the lever toward the module body, the hook can be readily disengaged by the actuating member and the optical module can be drawn out of the host board even in the case where optical modules are integrated in high density.

What is claimed is:

1. An optical module to be put into a host board, comprising:
   a module body to be inserted into the host board;
   a projection having a top portion, said projection being formed intervally on the module body and adapted to engage with a hook provided in the host board; and
   a lever mounted on the module body in order to disengage the hook engaging with the projection, to release engagement therebetween, said lever being separated from said projection,
   wherein said lever comprises:
   a first portion which moves when a force is applied thereon in a direction toward the module body; and
   a second portion which is adjacent to the projection and which moves according to movement of said first portion, and
   wherein with the movement of the first portion under the force on the first portion, the second portion moves upward so as to release the engagement between the hook and the projection.

2. The optical module according to claim 1, wherein said lever further comprises restoring means for locating said second portion nearer to the module body than said top portion of the projection.

3. The optical module according to claim 1, wherein a direction of the force applied on the first portion is a direction normal to a direction of insertion of said module body.

4. The optical module according to claim 1, wherein said lever comprises:
   a platelike part one end for forming said first portion and the other end for forming said second portion; and
   a mounting part for mounting said lever on the module body,
   a V-shaped curled part for connecting said platelike part and said mounting part, said V-shaped curled part being elastically deformable and having a restoring force,
   wherein the second portion is located nearer to the module body than the top portion of the projection by said restoring force of the curled part.

5. The optical module according to claim 4, wherein said lever further includes a rib located between the curled part and the first portion on the platelike part, said rib having a contact part and projecting toward the mounting part, and wherein, when the first part moves toward the mounting part, said rib goes into contact with the module body or with the mounting part and said contact part of the rib serves as a center of motion of the platelike part.

6. The optical module according to claim 1, wherein said first portion is provided with a handle having an operation part at a position apart from a center of the module body.

7. The optical module according to claim 1, wherein said module body comprises:
   an optical unit having at least either a light emitting unit or a light receiving unit;
   an optical-unit circuit board loaded with a circuit for operating the optical unit; and
   a housing for housing the optical unit and the optical-unit circuit board,
   wherein said projection is formed in the housing.

8. The optical module according to claim 7, wherein said optical unit has a light emitting unit and a light receiving unit.

9. The optical module according to claim 7, wherein said optical unit has at least one light emitting unit.

10. The optical module according to claim 7, wherein said optical unit has at least one light receiving unit.

11. The optical module according to claim 1, wherein said lever is made of metal.

12. The optical module according to claim 1, wherein said lever is made of plastic.

13. The optical module according to claim 1, further comprising an actuating member constructed so as to include a sliding contact part slidingly contacting the first portion of the lever and surrounding an optical connector insertion slot into which an optical connector is inserted, said actuating member being arranged to be rotatable about an axis part being a portion adjacent to said sliding contact part,
   wherein said sliding contact part slides on said first portion and moves the first portion toward the module body, when said actuating member is rotated about said axis part.

14. The optical module according to claim 13, wherein said axis part is comprised of a portion of said actuating member along an edge of a lever mounting surface on which said lever is mounted,
   wherein said sliding contact part extends from the axis part along an insertion direction of the optical connector,
   wherein a grip part is formed in a portion of the actuating member along an edge of a surface opposed to said lever mounting surface, and
   wherein the sliding contact part moves the first portion toward the module body when the actuating member is rotated in a leaving direction from a state in which the grip part is adjacent to the optical connector insertion slot.

15. The optical module according to claim 14, wherein the engagement between the hook and the projection is released through rotation before said grip part reaches an area occupied by the optical connector to be inserted.

16. The optical module according to claim 14, wherein an angle of rotation of the actuating member for releasing the engagement between the hook and the projection is not more than 68°.

17. The optical module according to claim 14, wherein the engagement between the hook and the projection is released when the grip part goes into an area occupied by the optical connector to be inserted, through rotation or when the grip part crosses over said occupied area through rotation.

18. The optical module according to claim 14, wherein an angle of rotation of the actuating member for releasing the engagement between the hook and the projection is greater than 68°.

19. The optical module according to claim 14, wherein said actuating member is rotatable between a first position where the grip part is adjacent to the optical connector insertion slot and a second position where the grip part is located on the same plane as the lever mounting surface, and
   wherein a projection adapted to engage with the sliding contact part in order to regulate the rotation in a direction from the second position to the first position of the actuating member, at said second position is formed in the first portion of the lever.

20. The optical module according to claim 19, wherein said actuating member is further rotatable from the second position in a direction opposite to the direction from the second position to the first position.

21. The optical module according to claim 1, further comprising an actuating member having:
   an axis part along an edge of a lever mounting surface on which the lever is mounted;
   a sliding contact part formed integrally with the axis part and slidingly contacting the first portion of the lever; and
   a grip part being normal to said axis part and extending along an edge of an optical connector insertion slot,
   wherein the sliding contact part slides on the first portion and moves the first portion toward the module body, when said actuating member is rotated about the axis part.

22. The optical module according to claim 21, wherein said sliding contact part extends from the axis part in an insertion direction of an optical connector, and wherein the sliding contact part moves the first portion toward the module body, when the actuating member is rotated in a leaving direction from a state in which the grip part is adjacent to the optical connector insertion slot.

23. The optical module according to claim 13, wherein the first portion of the lever is so curved that a surface in slide contact with said sliding contact part is concave.

24. The optical module according to claim 13, further comprising a handle having: a contact part located on the opposite side to the first portion with the sliding contact part in between and contacting the sliding contact part; and a holding part projecting in a direction opposite to an insertion direction of the optical connector from an end face having the optical connector insertion slot and being continuous from the contact part.

25. The optical module according to claim 24, wherein said lever further comprises an extending part projecting and extending from the first portion in the direction opposite to the insertion direction of the optical connector from the end face having the optical connector insertion slot, and wherein the holding part of the handle is coupled to the extending part of the lever, so that the handle and the lever are continuous.

26. The optical module according to claim 14, wherein a protrusion protruding in a direction opposite to the optical connector insertion direction from an end face having the optical connector insertion slot is formed in the grip part of the actuating member.

27. The optical module according to claim 7, further comprising a pawl adapted so that when an optical connector to be coupled to the optical unit is inserted into the housing, the pawl goes into contact with the optical connector to restrict the movement of the first portion.

* * * * *